US011656820B2

(12) United States Patent
Yamada

(10) Patent No.: US 11,656,820 B2
(45) Date of Patent: May 23, 2023

(54) PRINT INSTRUCTION APPARATUS, STORAGE MEDIUM, AND PRINT SYSTEM

(71) Applicant: Seiko Epson Corporation, Tokyo (JP)

(72) Inventor: Yusuke Yamada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/659,513

(22) Filed: Apr. 18, 2022

(65) Prior Publication Data

US 2022/0342618 A1    Oct. 27, 2022

(30) Foreign Application Priority Data

Apr. 21, 2021    (JP) .............................. JP2021-071680

(51) Int. Cl.
*G06F 3/12*    (2006.01)

(52) U.S. Cl.
CPC .......... *G06F 3/1256* (2013.01); *G06F 3/1205* (2013.01); *G06F 3/1208* (2013.01); *G06F 3/1292* (2013.01); *G06F 3/1293* (2013.01); *G06F 3/1204* (2013.01)

(58) Field of Classification Search
CPC .... G06F 3/1256; G06F 3/1205; G06F 3/1208; G06F 3/1292; G06F 3/1293; G06F 3/1204; G06F 3/048
USPC ........................................................ 358/471
See application file for complete search history.

(56) References Cited

U.S. PATENT DOCUMENTS

| 8,984,310 B2 * | 3/2015 | Kuroishi | G06F 3/1285 |
| | | | 713/340 |
| 2014/0253964 A1 * | 9/2014 | Asai | G06F 3/1204 |
| | | | 358/1.15 |
| 2020/0168178 A1 | 5/2020 | Yamada | |

FOREIGN PATENT DOCUMENTS

| JP | 2014-174663 | 9/2014 |
| JP | 2020-086111 | 6/2020 |

* cited by examiner

*Primary Examiner* — Darryl V Dottin
(74) *Attorney, Agent, or Firm* — Workman Nydegger

(57) ABSTRACT

A print instruction apparatus that communicates with a print apparatus includes a display section that displays a first image bundle including first and the second images, a selection section that selects at least one of first document information associated with the first image bundle, first image information associated with the first image, and second image information associated with the second image based on a signal received by a display controller, and a communication section that transmits print instruction information indicating an instruction for printing based on a result of the selection performed by the selection section. The communication section transmits, when the selection section selects the first document information but does not select the first image information or the second image information, first instruction information instructing printing of the first document information as the print instruction information.

10 Claims, 11 Drawing Sheets

PRINT INSTRUCTION APPARATUS, STORAGE MEDIUM, AND PRINT SYSTEM

The present application is based on, and claims priority from JP Application Serial Number 2021-071680, filed Apr. 21, 2021, the disclosure of which is hereby incorporated by reference herein in its entirety.

BACKGROUND

1. Technical Field

The present disclosure relates to a print instruction apparatus, a storage medium, and a print system.

2. Related Art

Print instruction apparatuses that transmit a print instruction to print apparatuses have been widely used.

JP-A-2014-174663 discloses a mobile terminal that instructs printing of an image based on image data. The mobile terminal instructs, when short-range wireless communication is established with a print apparatus while a first image for identifying an image data set including a plurality of image data is displayed, printing of images based on all the image data included in the image data set. On the other hand, the mobile terminal instructs, when short-range wireless communication is established with a print apparatus while one of the images included in the image data set is displayed, printing based on image data corresponding to the displayed image.

JP-A-2020-86111 discloses display of an image bundle including a plurality of thumbnail images in a first screen of a display apparatus and display of one of the thumbnails selected from the image bundle in a second screen.

When a print instruction is issued under the control disclosed in JP-A-2014-174663 with a configuration in which a print instruction apparatus, such as a mobile terminal, displays a plurality of thumbnail images and an image bundle including the plurality of thumbnail images in a single screen as disclosed in JP-A-2020-86111, the print instruction apparatus is required to display a page selection screen that does not display image bundles.

SUMMARY

According to an aspect of the present disclosure, a print instruction apparatus that communicates with a print apparatus includes a display section that displays a first image, a second image, and a first image bundle including the first image and the second image, a display controller that receives a signal based on a user operation, a selection section that selects at least one of first document information associated with the first image bundle, first image information associated with the first image, and second image information associated with the second image based on the signal received by the display controller, and a communication section that transmits print instruction information indicating an instruction for printing based on a result of the selection performed by the selection section. The communication section transmits, when the selection section selects the first document information but does not select the first image information or the second image information, first instruction information instructing printing of the first document information as the print instruction information, and transmits, when the selection section selects the first image information, second instruction information instructing printing of the first image information as the print instruction information.

According to another aspect of the present disclosure, a non-transitory computer-readable storage medium stores a control program causing a computer to execute a print instruction transmitted to a print apparatus. The control program causes a computer to function as a display controller that displays a first image, a second image, and a first image bundle including the first image and the second image in a display section and receives a signal based on a user operation, a selection section that selects at least one of first document information associated with the first image bundle, first image information associated with the first image, and second image information associated with the second image based on the signal received by the display controller, and a communication section that transmits print instruction information indicating an instruction for printing based on a result of the selection performed by the selection section. The communication section transmits, when the selection section selects the first document information but does not select the first image information or the second image information, first instruction information instructing printing of the first document information as the print instruction information, and transmits, when the selection section selects the first image information, second instruction information instructing printing of the first image information as the print instruction information.

According to a further aspect of the present disclosure, a print system includes a print apparatus and a print instruction apparatus. The print instruction apparatus includes a display section that displays a first image, a second image, and a first image bundle including the first image and the second image, a display controller that receives a signal based on a user operation, a selection section that selects at least one of first document information associated with the first image bundle, first image information associated with the first image, and second image information associated with the second image based on the signal received by the display controller, and a communication section that transmits print instruction information indicating an instruction for printing to the print apparatus based on a result of the selection performed by the selection section. The communication section transmits, when the selection section selects the first document information but does not select the first image information or the second image information, first instruction information instructing printing of the first document information as the print instruction information, and transmits, when the selection section selects the first image information, second instruction information instructing printing of the first image information as the print instruction information. The print apparatus executes printing based on the print instruction information.

DESCRIPTION OF EXEMPLARY EMBODIMENTS

Hereinafter, an embodiment will be described with reference to the accompanying drawings.

A print system 100 according to this embodiment will be described.

Figure 1:
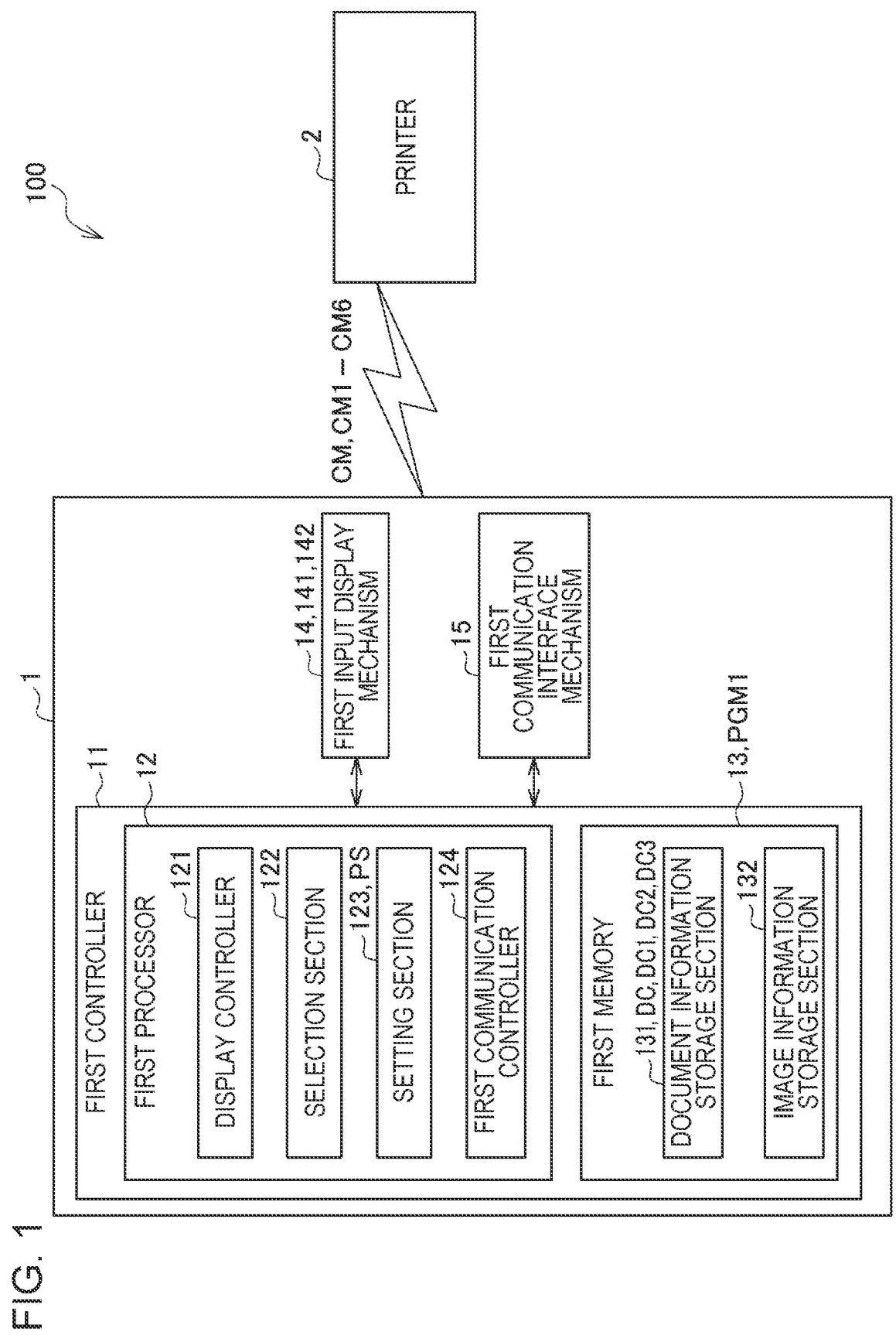
FIG. 1 is a diagram illustrating examples of configurations of a print system and a smartphone.

FIG. 1 is a diagram illustrating examples of configurations of the print system 100 and a smartphone 1.

The print system 100 includes the smartphone 1 and a printer 2.

The smartphone 1 and the printer 2 are connected to each other in a communication available manner by short-range wireless communication, such as Bluetooth (registered trademark) or NFC (Near Field Communication). Furthermore, the smartphone 1 and the printer 2 are connected to each other in a communication available manner through wireless communication, such as Wi-Fi (registered trademark). The wireless communication using Wi-Fi enables high-speed communication when compared with the short-range wireless communication, such as NFC. The short-range wireless communication, such as NFC, corresponds to an example of first communication. Wireless communication using Wi-Fi corresponds to an example of second communication.

The smartphone 1 selects a print target in accordance with a user operation and transmits print instruction information CM indicating printing of the selected print target. The smartphone 1 may directly transmit the print instruction information CM to the printer 2 or transmit the print instruction information CM through a server apparatus or the like.

The printer 2 prints the print target on a print medium, such as a print sheet, based on the print instruction information CM supplied from the smartphone 1.

A configuration of the printer 2 will be described with reference to FIG. 2.

Furthermore, the smartphone 1 is connected to a personal computer or a server apparatus, not illustrated, in a communication available manner through wireless communication, such as Wi-Fi (registered trademark). The smartphone 1 obtains document information DC from the personal computer or the server apparatus.

The smartphone 1 includes a first controller 11, a first input display mechanism 14, and a first communication interface mechanism 15.

The first controller 11 controls various sections included in the smartphone 1.

The first input display mechanism 14 which is a touch panel receives operations performed by a user and displays various images. The touch panel includes a display 141, such as an LCD (Liquid Crystal Display), and a touch sensor 142.

The display 141 displays various images in accordance with instructions issued by the first controller 11. The touch sensor 142 is formed integrally with a display surface of the display 141 and accepts a touch operation performed by the user. The touch sensor 142 generates a signal based on a user operation and transmits the generated signal to the display controller 121. The display 141 corresponds to an example of a "display section". The touch sensor corresponds to an example of an "input section". The first input display mechanism 14 has functions of the "display section" and the "input section".

The first communication interface mechanism 15 including an antenna, an RF (Radio Frequency) circuit, an encoder, and a decoder communicates with the printer 2 through the short-range wireless communication, such as Bluetooth or NFC, in accordance with an instruction issued by the first controller 11. The first communication interface mechanism 15 communicates with the server apparatus, not illustrated, and the printer 2 through the wireless communication, such as Wi-Fi.

The smartphone 1 corresponds to an example of a "print instruction apparatus".

Although the first communication interface mechanism 15 communicates with the printer 2 through the short-range wireless communication, such as Bluetooth or NFC, in this embodiment, the communication method is not limited to this. The first communication interface mechanism 15 may communicate with the printer 2 through other types of wireless communication, such as Wi-Fi (registered trademark). The first communication interface mechanism 15 may communicate with the printer 2 in a wired manner in accordance with an Ethernet (registered trademark) standard or the like.

The first controller 11 includes a first processor 12 and a first memory 13.

The first memory 13 is a storage device that stores programs to be executed by the first processor 12 and data in a nonvolatile manner. The first memory 13 is configured by a magnetic storage device, such as an HDD (Hard Disk Drive), a semiconductor storage device, such as an SSD (Solid State Drive), a semiconductor storage element, such as a flash ROM (Read Only Memory), or other types of nonvolatile storage device. The first memory 13 may include a RAM (Random Access Memory) constituting a work area of the first processor 12. The first memory 13 stores data to be processed by the first controller 11 and a first control program PGM1 to be executed by the first processor 12.

The first controller 11 corresponds to an example of a "computer".

The first processor 12 may be configured by a single processor, or a plurality of processors may function as the first processor 12. The first processor 12 executes a first control program PGM1 so as to control the sections included in the smartphone 1.

Although the first processor 12 executes the first control program PGM1 so as to control the sections in the smartphone 1 in this embodiment, the first controller 11 may be an ASIC (Application Specific Integrated Circuit). The ASIC may execute processes using implemented functions. The first controller 11 may be a signal processing circuit. The signal processing circuit may perform signal processing so as to execute a process.

The first controller 11 includes, as function blocks, a display controller 121, a selection section 122, a setting section 123, a first communication controller 124, a document information storage section 131, and an image information storage section 132. When the first processor 12 executes the first control program PGM1, the first controller 11 functions as the display controller 121, the selection section 122, the setting section 123, and the first communication controller 124. When the first processor 12 executes the first control program PGM1, the first controller 11 causes the first memory 13 to function as the document information storage section 131 and the image information storage section 132.

The first control program PGM1 corresponds to an example of a "control program".

The document information storage section 131 stores a plurality of document information DC. The document information DC employs a document format of a PDF (Portable Document Format) type, a JPEG type, or the like. The document information storage section 131 obtains and stores the document information DC from the personal computer or the server apparatus under control of the first communication controller 124.

The document information DC includes first document information DC1, second document information DC2, and third document information DC3.

In this embodiment, the first document information DC1, the second document information DC2, and the third document information DC3 are collectively referred to as the document information DC where appropriate in a description below when they are not distinguished from one another.

The first document information DC1 includes a plurality of first page information P1. In this embodiment, the first document information DC1 includes six first page information P1, that is, first page information P11 to first page information P16. The first page information P11 to the first page information P16 correspond to respective pages constituting a document corresponding to the first document information DC1.

The second document information DC2 includes a plurality of second page information P2. In this embodiment, the second document information DC2 includes six second page information P2, that is, second page information P21 to second page information P26. The second page information P21 to the second page information P26 correspond to respective pages constituting a document corresponding to the second document information DC2.

The third document information DC3 includes a plurality of third page information P3. In this embodiment, the third document information DC3 includes six third page information P3, that is, third page information P31 to third page information P36. The third page information P31 to the third page information P36 correspond to respective pages constituting a document corresponding to the third document information DC3.

The image information storage section 132 stores various images and various screens to be displayed in the display 141. The image information storage section 132 stores a document selection screen 300 illustrated in FIG. 3, a preview screen 500 illustrated in FIG. 4, and the like.

The display controller 121 controls display of various images and various screens to be displayed in the display 141. The display controller 121 receives a signal based on an operation performed by the user generated by the touch sensor 142 of the first input display mechanism 14. The display controller 121 transmits the received signal to the selection section 122. As an example, the display controller 121 displays a first thumbnail image bundle 310, a second thumbnail image bundle 320, and a third thumbnail image bundle 330 in the document selection screen 300 illustrated in FIG. 3 in such a manner that the user may select one of the image bundles. The first thumbnail image bundle 310 is an image based on the first document information DC1. The first thumbnail image bundle 310 and the first document information DC1 are associated with each other. The second thumbnail image bundle 320 is an image based on the second document information DC2. The second thumbnail image bundle 320 and the second document information DC2 are associated with each other. The third thumbnail image bundle 330 is an image based on the third document information DC3. The third thumbnail image bundle 330 and the third document information DC3 are associated with each other. Association information that associates each of the thumbnail image bundles with the corresponding document information DC is stored in the first memory 13.

The first thumbnail image bundle 310 includes a plurality of first thumbnail images 31. The second thumbnail image bundle 320 includes a plurality of second thumbnail images 32. The third thumbnail image bundle 330 includes a plurality of third thumbnail images 33.

The first thumbnail images 31 are based on the first page information P1 included in the first document information DC1. The first thumbnail images 31 and the first page information P1 are associated with each other. The second thumbnail images 32 are based on the second page information P2 included in the second document information DC2. The second thumbnail images 32 and the second page information P2 are associated with each other. The third thumbnail images 33 are based on the third page information P3 included in the third document information DC3. The third thumbnail images 33 and the third page information P3 are associated with each other.

In this embodiment, when the thirst thumbnail image bundle 310, the second thumbnail image bundle 320, and the third thumbnail image bundle 330 are not distinguished from one another, they are collectively referred to as a thumbnail image bundle where appropriate in a description below.

In this embodiment, when the thirst thumbnail images 31, the second thumbnail images 32, and the third thumbnail images 33 are not distinguished from one another, they are collectively referred to as a thumbnail image where appropriate in the description below.

In this embodiment, when the first page information P1, the second page information P2, and the third page information P3 are not distinguished from one another, they are collectively referred to as page information PG where appropriate in the description below.

Association information that associates each of the thumbnail images with the corresponding page information PG is stored in the first memory 13.

The selection section 122 selects the document information DC or the page information PG based on a signal received from the display controller 121. The selection section 122 receives a signal generated based on an operation performed by the user using the touch sensor 142 from the display controller 121 and selects the document information DC or the page information PG.

Figure 3:
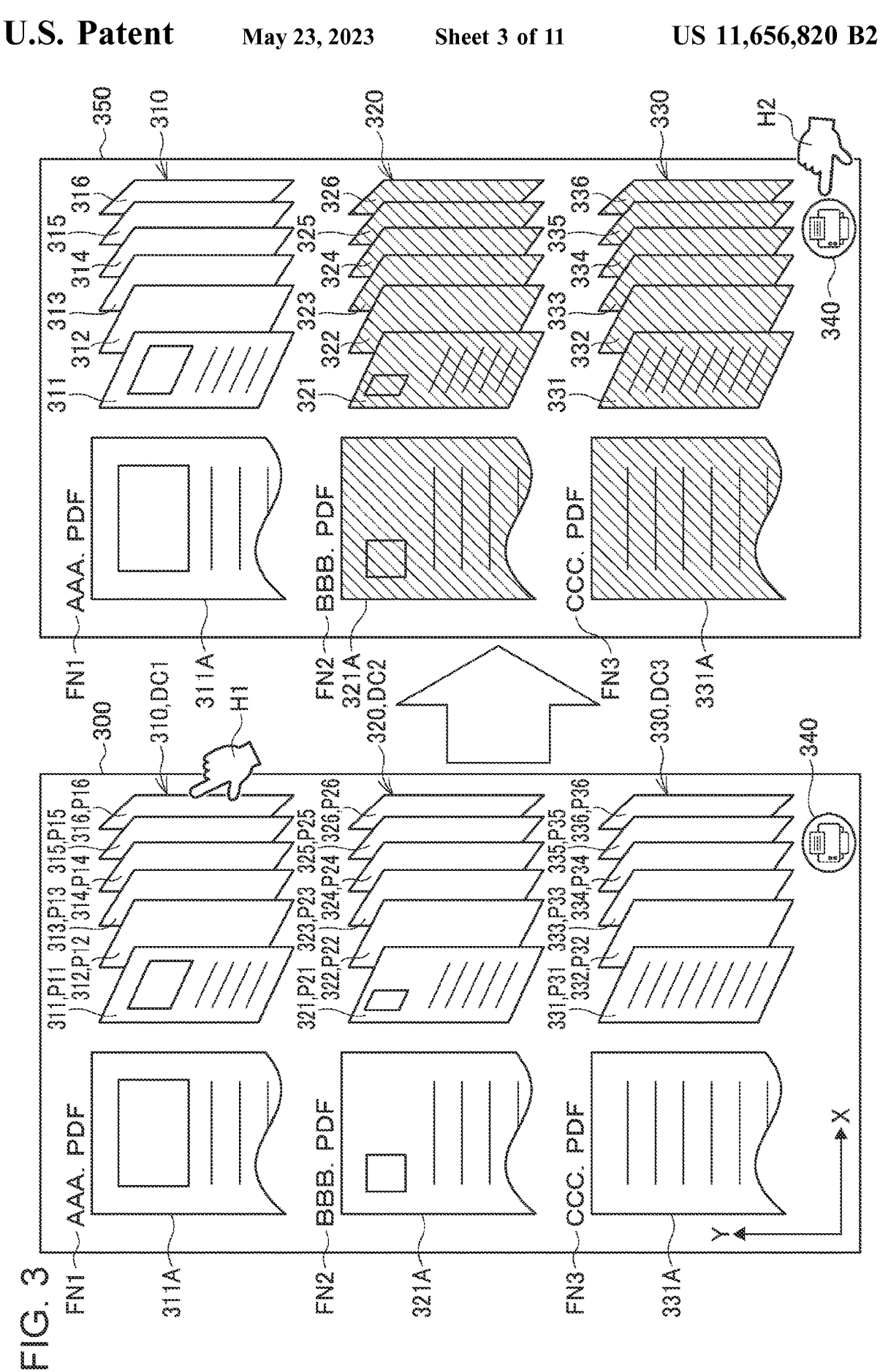
FIG. 3 is a diagram illustrating an example of a document selection screen.

The first input display mechanism 14 accepts a selection performed by the user on at least one of the thumbnail image bundles displayed in the document selection screen 300 illustrated in FIG. 3, that is, the first thumbnail image bundle 310, the second thumbnail image bundle 320, and the third thumbnail image bundle 330, based on an operation performed by the user. The selection section 122 selects the document information DC associated with the thumbnail image bundle selected by the user that has been accepted.

Figure 4:
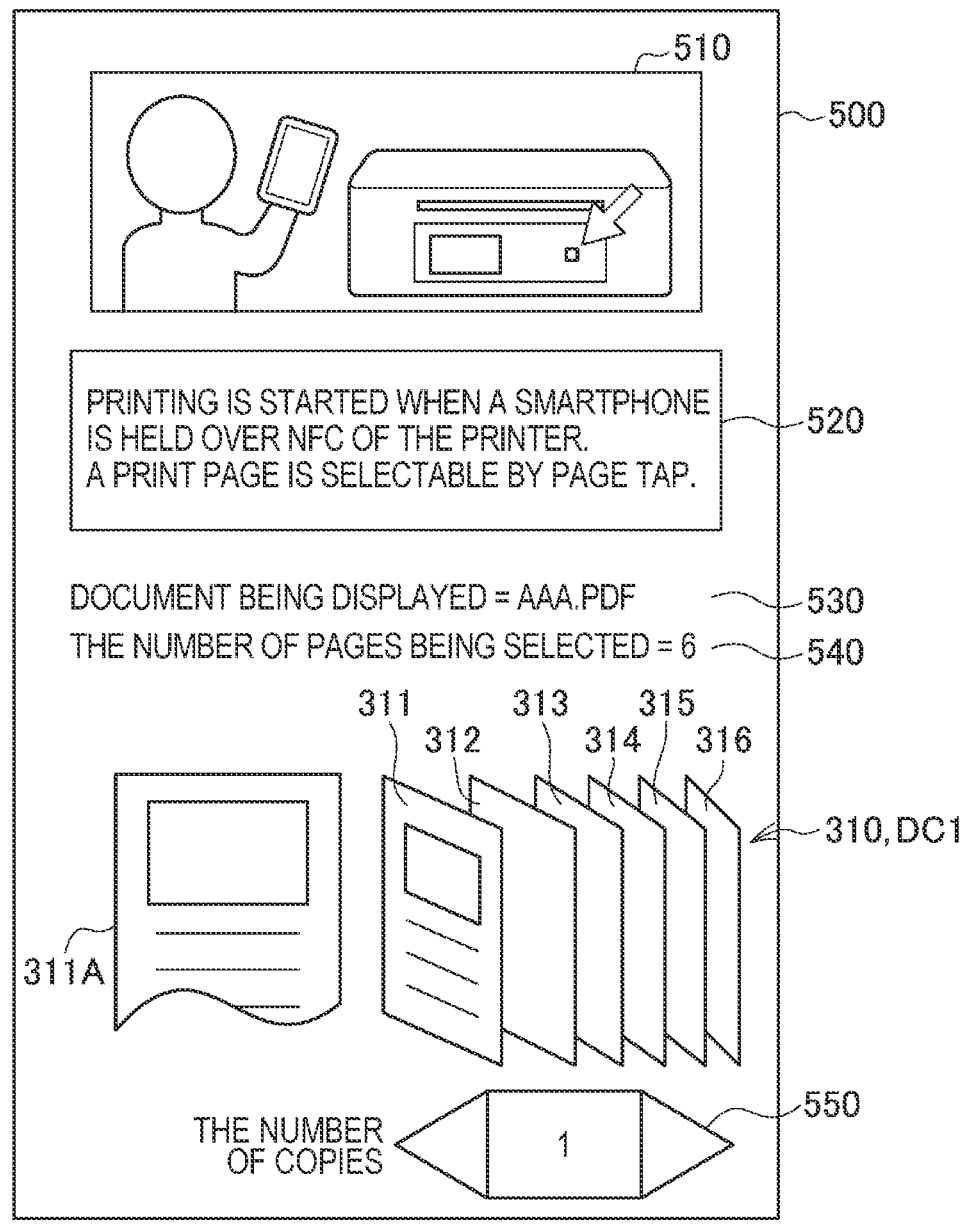
FIG. 4 is a diagram illustrating an example of a preview screen.

The first input display mechanism 14 accepts a selection performed by the user on at least one of the thumbnail images displayed in the preview screen 500 illustrated in FIG. 4 based on an operation performed by the user. The selection section 122 selects the page information PG associated with the thumbnail image selected by the user.

The setting section 123 sets the number of copies of the document information DC or the page information PG selected by the selection section 122.

The setting section 123 accepts an operation performed by the user on a copy count input section 550 of the preview screen 500 illustrated in FIG. 4 so as to set the number of copies PS.

The first communication controller 124 transmits the print instruction information CM to the printer 2 through the first communication interface mechanism 15.

The print instruction information CM includes information indicating the number of copies PS.

In this embodiment, examples of the print instruction information CM include first instruction information CM1, second instruction information CM2, third instruction information CM3, fourth instruction information CM4, fifth instruction information CM5, and sixth instruction information CM6.

The first communication controller 124 corresponds to an example of a "communication section".

The first instruction information CM1 instructs printing of the first document information DC1.

The second instruction information CM2 instructs printing of first page information P11 included in the first document information DC1.

The third instruction information CM3 instructs printing of first page information P11 and first page information P12 included in the first document information DC1.

The fourth instruction information CM4 instructs printing of the first document information DC1 and the second document information DC2.

The fifth instruction information CM5 instructs printing of the first page information P11 included in the first document information DC1 and the second page information P21 included in the second document information DC2.

The sixth instruction information CM6 instructs printing of the first page information P11 and the first page information P12 included in the first document information DC1 and the second page information P21 and second page information P22 included in the second document information DC2.

The print instruction information CM is transmitted by the first communication controller 124 when the smartphone 1 and the printer 2 perform the short-range wireless communication in a state in which the display 141 is displaying the document selection screen 300 or a state in which the display 141 is displaying the preview screen 500.

The first page information P11 corresponds to an example of "first image information".

The first page information P12 corresponds to an example of "second image information".

The second page information P21 corresponds to an example of "third image information".

The second page information P22 corresponds to an example of "fourth image information".

Next, a configuration of the printer 2 will be described with reference to FIG. 2.

Figure 2:
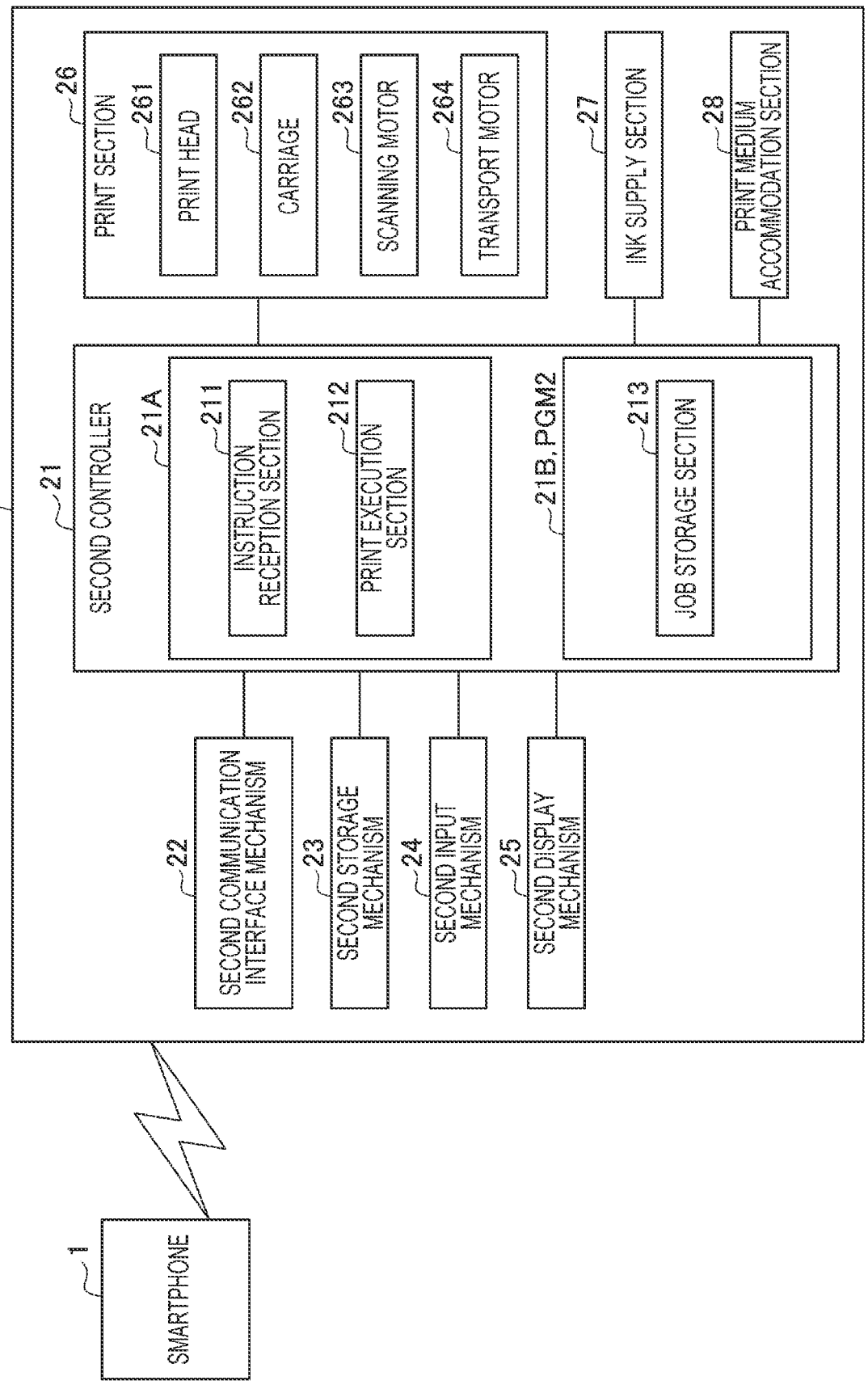
FIG. 2 is a diagram illustrating an example of a configuration of a printer.

FIG. 2 is a diagram illustrating an example of a configuration of the printer 2.

The printer 2 is an apparatus that prints characters, images, and the like on a print medium, such as a print sheet.

As illustrated in FIG. 2, the printer 2 includes a second controller 21, a second communication interface mechanism 22, a second storage mechanism 23, a second input mechanism 24, a second display mechanism 25, a print section 26, an ink supply section 27, and a print medium accommodation section 28.

The printer 2 corresponds to an example of a "print apparatus".

The second controller 21 including a second processor 21A, such as a CPU (central processing unit), a second memory 21B, such as a ROM or a RAM, an ASIC (Application Specific Integrated Circuit), and a signal processing circuit controls the sections included in the printer 2. The second memory 21B stores a second control program PGM2 and identification information for identifying the printer 2. The identification information is a production number or the like and is transmitted to the smartphone1 through the short-range wireless communication. The identification information may be transmitted to the smartphone 1 by Wi-Fi communication.

In the second controller 21, the second processor 21A reads the second control program PGM2 stored in the second memory 21B and executes a process. Alternatively, a process is executed by a function in which the ASIC is implemented. Alternatively, the signal processing circuit performs signal processing so as to execute a process. The second controller 21 executes a process by cooperation between hardware and software.

The second controller 21 includes, as function blocks, an instruction reception section 211, a print execution section 212, and a job storage section 213.

A function realized when the second processor 21A executes the second control program PGM2 is illustrated as a function block for descriptive purpose, and specified application software or hardware is not illustrated as a function block. The function blocks are described hereinafter.

The second communication interface mechanism 22 including an antenna, an RF circuit, an encoder, and a decoder communicates with the smartphone 1 through a short-range wireless communication, such as Bluetooth or NFC, in accordance with an instruction issued by the second controller 21.

In this embodiment, the second communication interface mechanism 22 communicates with the smartphone 1 through another wireless communication, such as Wi-Fi. The second communication interface mechanism 22 may communicate with the smartphone 1 in a wired manner in accordance with an Ethernet standard.

The second storage mechanism 23 includes a nonvolatile memory, such as an HDD, an EEPROM (Electrically Erasable Programmable Read-Only Memory) or an SSD, and stores various data in a rewritable manner. The second storage mechanism 23 may be an NFC tag. The NFC tag stores identification information or the like for identifying the printer 2. The first communication interface mechanism 15 of the smartphone 1 may read the NFC tag so as to obtain identification information.

The second input mechanism 24 including an operation switch disposed on the printer 2 and an input unit, such as a touch panel, detects an operation performed by a user on the input unit and outputs a detection signal corresponding to the operation to the second controller 21. The second controller 21 executes a process in accordance with an operation of the user based on an input from the second input mechanism 24.

The second display mechanism 25 including a plurality of LEDs (Light Emitting Diodes) and a display panel executes turning on, turning off, and blinking of the LEDs in a predetermined mode, display of information on the display panel, and the like under control of the second controller 21.

The print section 26 prints characters, images, and the like on a print medium, such as a print sheet, by ink under control of the second controller 21. The print section 26 includes a print head 261, a carriage 262, a scanning motor 263, and a transport motor 264 as a configuration of printing.

The print head 261 is an ink jet type and ejects ink supplied from the ink supply section 27 to a print medium. The carriage 262 having the print head 261 mounted thereon performs scanning in a direction intersecting with a direction in which a print medium is transported. The scanning motor 263 causes the carriage 262 to perform scanning. The transport motor 264 transports a print medium in the transport direction.

The ink supply section 27 accommodates ink tanks storing inks and supplies the inks to the print head 261 of the print section 26 from the ink tanks. The inks supplied from the ink supply section 27 are a cyan (C) ink, a magenta (M) ink, a yellow (Y) ink, and a black (K) ink.

The print medium accommodation section 28 may accommodate print media. When a print medium is cut paper, the print medium accommodation section 28 transports the accommodated cut paper to a transport path, not illustrated, by the transport motor 264. The print medium accommodation section 28 collects a printed matter that is a print medium that has been subjected to printing. As a configuration for collecting a printed matter, cut paper may be mounted in a stacking manner.

Next, function blocks included in the second controller 21 of the printer 2 will be described.

The second controller 21 includes, as function blocks, the instruction reception section 211, the print execution section 212, and the job storage section 213. When the second processor 21A executes the second control program PGM2, the second controller 21 functions as an instruction reception section 211 and a print execution section 212. When the second processor 21A executes the second control program PGM2, the second controller 21 causes the second memory 21B to function as a job storage section 213.

The job storage section 213 stores the print instruction information CM received by the instruction reception section 211. The print instruction information CM includes information for specifying the document information DC or information for specifying the page information PG, and the number of copies PS. The job storage section 213 may directly receive, from the smartphone 1, and store the document information DC and the page information PG or may receive and store the document information DC and the page information PG stored in the server apparatus in advance.

The instruction reception section 211 receives the print instruction information CM supplied from the first communication controller 124 of the smartphone 1. The instruction reception section 211 may directly receive the print instruction information CM from the smartphone 1 or may receive the print instruction information CM transmitted by the smartphone 1 through the server apparatus. The instruction reception section 211 causes the job storage section 213 to store the received print instruction information CM.

The print execution section 212 controls printing executed by the print section 26. The print execution section 212 controls the print section 26 and controls printing based on the print instruction information CM.

Next, a concrete example of a process of the first controller 11 of the smartphone 1 will be described with reference to FIGS. 3 to 8.

FIG. 3 is a diagram illustrating an example in which the first input display mechanism 14 displays the first thumbnail image bundle 310 to the third thumbnail image bundle 330 in a user selectable manner, the selection section 122 selects the first document information DC1 as a print target from among the first document information DC1 to the third document information DC3 respectively associated with the first thumbnail image bundle 310 to the third thumbnail image bundle 330.

FIG. 3 is a diagram illustrating the document selection screens 300 and 350.

The document selection screen 300 is displayed in the display 141 under control of the display controller 121 based on an operation for starting a print instruction issued by the user.

The document selection screen 300 displays the first thumbnail image bundle 310 to the third thumbnail image bundle 330, a first main image 311A, a second main image 321A, a third main image 331A, a first document name FN1, a second document name FN2, a third document name FN3, and a print button 340.

The first thumbnail image bundle 310, the first main image 311A, and the first document name FN1 are displayed in an upper portion in the document selection screen 300. The second thumbnail image bundle 320, the second main image 321A, and the second document name FN2 are displayed in a middle portion in the document selection screen 300. The third thumbnail image bundle 330, the third main image 331A, and the third document name FN3 are displayed in a lower portion in the document selection screen 300.

The first document name FN1 and the first main image 311A are displayed on a left side of the first thumbnail image bundle 310. The second document name FN2 and the second main image 321A are displayed on a left side of the second thumbnail image bundle 320. The third document name FN3 and the third main image 331A are displayed on a left side of the third thumbnail image bundle 330.

The first thumbnail image bundle 310 of FIG. 3 is constituted by six pages, the first thumbnail image 311 to the first thumbnail image 316 included in the first thumbnail image bundle 310 are based on the first page information P11 to the first page information P16, respectively. The first thumbnail image 311 to the first thumbnail image 316 are associated with the first page information P11 to the first page information P16, respectively.

The first thumbnail image 311 is based on the first page information P11. The first thumbnail images 311 and the first page information P11 are associated with each other. The first thumbnail image 312 is based on the first page information P12. The first thumbnail image 312 and the first page information P12 are associated with each other. The first thumbnail image 313 is based on the first page information P13. The first thumbnail image 313 and the first page information P13 are associated with each other. The first thumbnail image 314 is based on the first page information P14. The first thumbnail image 314 and the first page information P14 are associated with each other. The first thumbnail image 315 is based on the first page information P15. The first thumbnail image 315 and the first page information P15 are associated with each other. The first thumbnail image 316 is based on the first page information P16. The first thumbnail image 316 and the first page information P16 are associated with each other. These associated information are stored in the first memory 13.

In this embodiment, when the first thumbnail image 311 to the first thumbnail image 316 are not distinguished from one another, they are collectively referred to as a first thumbnail image 31 where appropriate in the description below.

The first thumbnail image bundle 310 includes a configuration portion in which the first thumbnail images 31 adjacent to each other are arranged at equal intervals in such a manner that portions of the first thumbnail images 31 overlap with each other and a configuration portion in which the first thumbnail images 31 adjacent to each other are arranged with intervals that becomes wider while portions of the first thumbnail images 31 overlap with each other.

The individual first thumbnail images 31 are arranged in an X axis that is a first virtual axis extending in a first direction of a screen constituting the document selection screen 300. The first direction is a lateral direction in FIG. 3. Each of the first thumbnail images 31 is displayed such that each of the first thumbnail images 31 rotates with a Y axis at a center that intersects with the first virtual axis and that is a second virtual axis in a second direction of the screen constituting the document selection screen 300, and further rotates with the first virtual axis at a center. The second direction is a vertical direction in FIG. 3.

The display controller 121 rotates each of the first thumbnail images 31 with the first virtual axis and the second virtual axis at the center. When the user faces the display 141, the display controller 121 deforms the first thumbnail image bundle 310 into such a mode that the first thumbnail image bundle 310 including the six first thumbnail images 31 is overviewed. It is assumed that the display controller 121 deforms the first thumbnail images 31 in the individual pages so that the pages are viewed such a manner that the six first thumbnail images 31 included in the first thumbnail image bundle 310 are diagonally viewed from above as a perspective view.

The display controller 121 similarly displays the second thumbnail image bundle 320 and the third thumbnail image bundle 330 in the display 141.

The first main image 311A is obtained by displaying the first thumbnail image 31 selected from among the first thumbnail image 311 to the first thumbnail image 316 in an enlarged manner. In FIG. 3, the first main image 311A is obtained by displaying the first thumbnail image 311 in an enlarged manner.

The second main image 321A is obtained by displaying the second thumbnail image 32 selected from among the second thumbnail image 321 to the second thumbnail image 326 in an enlarged manner. In FIG. 3, the second main image 321A is obtained by displaying the second thumbnail image 321 in an enlarged manner.

The third main image 331A is obtained by displaying the third thumbnail image 33 selected from among the third thumbnail image 331 to the third thumbnail image 336 in an enlarged manner. In FIG. 3, the third main image 331A is obtained by displaying the third thumbnail image 331 in an enlarged manner.

The first document name FN1, the second document name FN2, and the third document name FN3 correspond to a document name of the first document information DC1, a document name of the second document information DC2, and a document name of the third document information DC3, respectively.

In FIG. 3, the first document name FN1, the second document name FN2, and the third document name FN3 are "AAA.PDF", "BBB.PDF", and "CCC.PDF", respectively.

A print button 340 is displayed on a lower side of the third thumbnail image bundle 330. When the print button 340 is touched by a finger H2 of the user as illustrated in the document selection screen 350, the display controller 121 switches the display to the preview screen 500 illustrated in FIG. 4.

While the first input display mechanism 14 displays the document selection screen 300 illustrated in FIG. 3, the selection section 122 accepts a touch operation performed by the user and selects, as a print target, at least one of the first document information DC1 associated with the first thumbnail image bundle 310, the second document information DC2 associated with the second thumbnail image bundle 320, and the third document information DC3 associated with the third thumbnail image bundle 330. FIG. 3 is a diagram illustrating an example in which the selection section 122 selects the first document information DC1 associated with the first thumbnail image bundle 310.

As illustrated in the document selection screen 300 of FIG. 3, when the user touches the first thumbnail image bundle 310 by a finger H1, the selection section 122 selects the first document information DC1 associated with the first thumbnail image bundle 310.

When the selection section 122 selects the first document information DC1, as illustrated in the document selection screen 350 of FIG. 3, the document selection screen 350 displays the first thumbnail image bundle 310 associated with the first document information DC1 and the first main image 311A in an emphasized manner. The display controller 121 performs control such that the first thumbnail image bundle 310 and the first main image 311A are displayed in the document selection screen 350 in highlighting.

As illustrated in the document selection screen 350 of FIG. 3, the display controller 121 performs control such that the second thumbnail image bundle 320, the second main image 321A, the third thumbnail image bundle 330, and the third main image 331A are displayed darker than the first thumbnail image bundle 310 and the first main image 311A.

Although the document information storage section 131 stores the first document information DC1, the second document information DC2, and the third document information DC3 in this embodiment, the present disclosure is not limited to this. The document information storage section 131 may store the first document information DC1, and the first communication controller 124 may obtain the second document information DC2 and the third document information DC3 from the personal computer or the server apparatus.

Before the first communication controller 124 receives the second document information DC2 and the third document information DC3, the document selection screen 300 displays the first main image 311A and the first thumbnail image bundle 310. When receiving the second document information DC2, the first communication controller 124 generates the second main image 321A and the second thumbnail image bundle 320 based on the second document information DC2 to be displayed in the document selection screen 300. When receiving the third document information DC3, the first communication controller 124 generates the third main image 331A and the third thumbnail image bundle 330 based on the third document information DC3 to be displayed in the document selection screen 300.

When the print button 340 is touched by the finger H2 of the user as illustrated in the document selection screen 350 of FIG. 3, the display controller 121 performs control such that the preview screen 500 is displayed in the display 141.

FIG. 4 is a diagram illustrating an example of the preview screen 500.

The preview screen 500 displays a guidance image display section 510, a guidance display section 520, a document name display section 530, a page count display section 540, the first main image 311A, the first thumbnail image bundle 310, and a copy count input section 550.

The preview screen 500 corresponds to an example of a "check screen".

The guidance image display section 510 displays an image indicating that printing is instructed to the printer 2 by the user holding the smartphone 1 close to the NFC of the printer 2.

An arrow mark displayed in the guidance image display section 510 indicates a position of NFC in the printer 2.

The guidance display section 520 displays text indicating a guidance associated with an operation to be performed by the user.

The guidance display section 520 displays text "Printing is started when a smartphone is held over NFC of the printer. A print page is selectable by page tap." as illustrated in FIG. 4. Content of the guidance displayed in the guidance display section 520 is not limited to that illustrated in FIG. 4.

The document name display section 530 displays a name of a document displayed in the preview screen 500. In FIG. 4, the document name display section 530 displays the document name "AAA.PDF" of the first thumbnail image bundle 310.

The page count display section 540 displays the number of pages of the document displayed in the preview screen 500. In FIG. 4, the page count display section 540 displays the number of pages included in the first thumbnail image bundle 310.

The first main image 311A is the same as the first main image 311A displayed in the document selection screen 300 of FIG. 3 and the document selection screen 350.

The first thumbnail image bundle 310 is the same as the first thumbnail image bundle 310 displayed in the document selection screen 300 of FIG. 3 and the document selection screen 350.

The copy count input section 550 accepts an instruction of the number of copies PS based on an operation performed by the user. The setting section 123 sets the number of copies PS based on an operation performed by the user on the copy count input section 550.

The copy count input section 550 corresponds to an example of a "reception section".

Printing is instructed to the printer 2 when the user holds the smartphone 1 close to NFC of the printer 2 in a state in which the preview screen 500 is displayed as illustrated in FIG. 4.

When the smartphone 1 directly transmits the first instruction information CM1 to the printer 2, the first communication controller 124 of the smartphone 1 transmits the first instruction information CM1 to the printer 2 through the first communication interface mechanism 15. The instruction reception section 211 of the printer 2 receives the first instruction information CM1 through the second communication interface mechanism 22. The print execution section 212 controls printing performed by the print section 26 based on the print instruction information CM1. The print execution section 212 controls printing of the first document information DC1.

The first communication controller 124 establishes wireless communication with the printer 2 through the short-range wireless communication by means of NFC and the Wi-Fi connection. The first communication controller 124 obtains identification information of the printer 2 through the first communication interface mechanism 15. The second controller 21 of the printer 2 transmits the identification information of the printer 2 stored in the second memory 21B to the first communication controller 124 through the second communication interface mechanism 22.

The first communication controller 124 that has received the identification information of the printer 2 transmits the first instruction information CM1 to the printer 2 through the first communication interface mechanism 15 based on the identification information. The first communication controller 124 transmits the first instruction information CM1 through the short-range wireless communication by means of NFC or the Wi-Fi communication to the printer 2. The first communication controller 124 transmits the first document information DC1 to the printer 2 through the Wi-Fi communication.

Although the first communication controller 124 transmits the first instruction information CM1 and the first document information DC1 to the printer 2, the present disclosure is not limited to this. The first communication controller 124 may transmit the first instruction information CM1 to the server apparatus that stores the first document information DC1 so as to transmit the first instruction information CM1 to the printer 2 through the server apparatus. The server apparatus may transmit the first instruction information CM1 to the printer 2 through a PC having a printer driver controlling the printer 2.

Although the smartphone 1 transmits the first document information DC1 stored in the first memory 13 to the printer 2, the present disclosure is not limited to this. The server apparatus stores the first document information DC1 in advance. When receiving the identification information of the printer 2 and the first instruction information CM1, the server apparatus may read the first document information DC1 associated with the first instruction information CM1 and transmit the first instruction information CM1 and the first document information DC1 to the printer 2 corresponding to the identification information.

The first instruction information CM1 instructs printing of the first document information DC1.

The first thumbnail image bundle 310 corresponds to an example of a "first image bundle".

Figure 5:
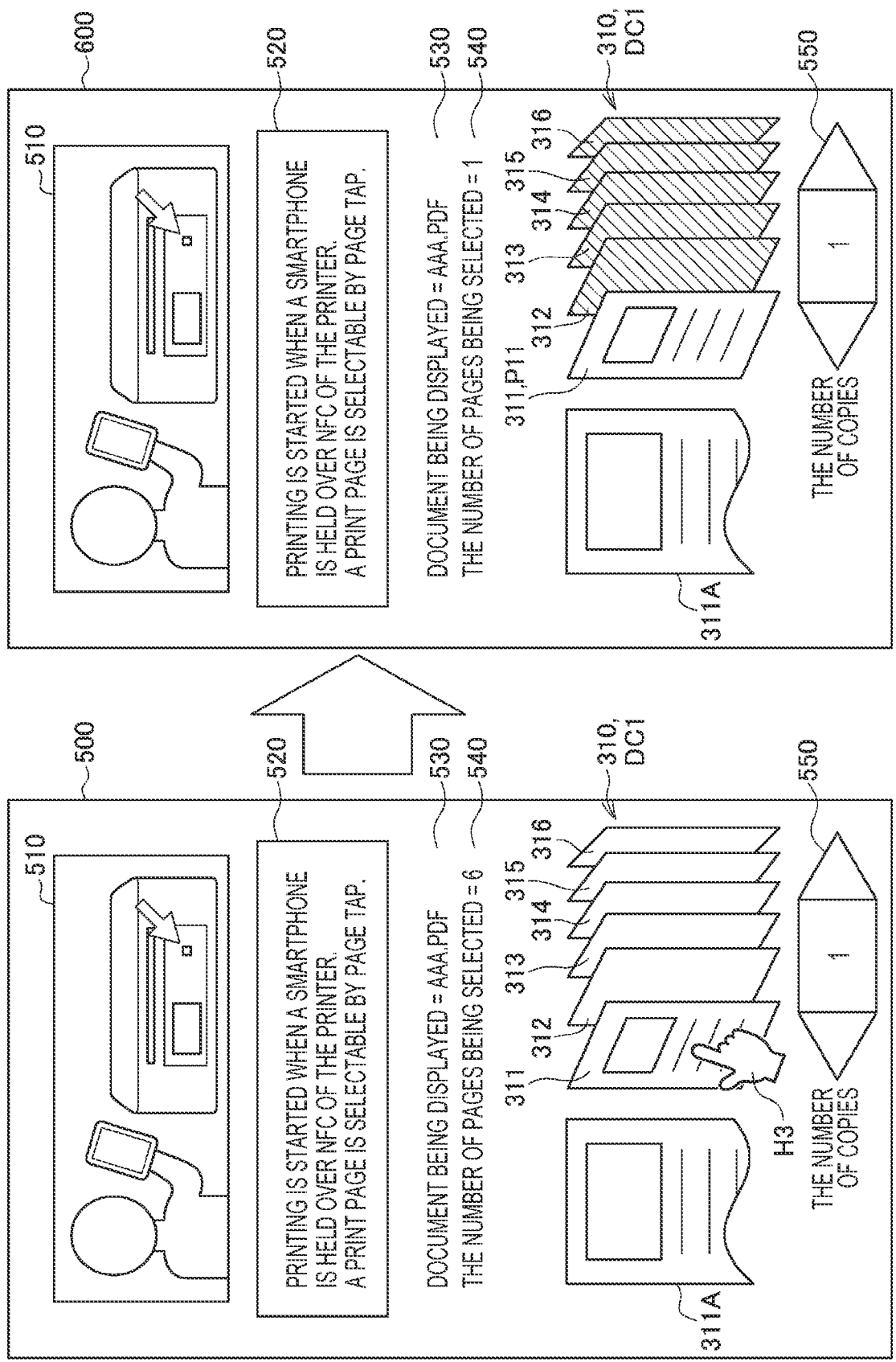
FIG. 5 is a diagram illustrating another example of the preview screen.

FIG. 5 is a diagram illustrating an example in which the selection section 122 selects the first page information P11 as a print target from among the first page information P11 to the first page information P16 of the first document information DC1.

FIG. 5 is a diagram illustrating examples of the preview screen 500 and a preview screen 600.

The preview screen 500 of FIG. 4 is illustrated on a left side in FIG. 5.

When a finger H3 of the user touches the first thumbnail image 311 selected from among the first thumbnail image 311 to the first thumbnail image 316 included in the first thumbnail image bundle 310 displayed in the preview screen 500, the selection section 122 selects the first page information P11 associated with the first thumbnail image 311 as a print target.

When the selection section 122 selects the first page information P11 as a print target, the display controller 121 performs control such that the first thumbnail image 311 associated with the first page information P11 is displayed in an emphasized manner. When the first main image 311A is obtained by displaying the first thumbnail image 311 in an enlarged manner, the display controller 121 performs control such that the first main image 311A is displayed in an emphasized manner. In FIG. 5, the display controller 121 performs control such that the first thumbnail image 311 and the first main image 311A are displayed in highlighting.

As illustrated in the preview screen 600 of FIG. 5, the display controller 121 performs control such that the first thumbnail image 312 to the first thumbnail image 316 are displayed darker than the first thumbnail image 311 and the first main image 311A.

The first thumbnail image 311 and the first main image 311A are associated with the first page information P11.

When the selection section 122 selects the first page information P11 as a print target, the page count display section 540 displays text "the number of pages being selected=1".

Printing is instructed to the printer 2 when the user holds the smartphone 1 close to the NFC of the printer 2 in a state in which the preview screen 600 is displayed as illustrated in FIG. 5.

The first communication controller 124 of the smartphone 1 transmits the second instruction information CM2 to the printer 2 through the first communication interface mechanism 15. The instruction reception section 211 of the printer 2 receives the second instruction information CM2 through the second communication interface mechanism 22. The print execution section 212 causes the print section 26 to perform printing corresponding to the second instruction information CM2. The print execution section 212 causes the print section 26 to perform printing of the first page information P11 of the first document information DC1.

The first communication controller 124 that has received the identification information of the printer 2 transmits the second instruction information CM2 to the printer 2 through the first communication interface mechanism 15 based on the identification information. The first communication controller 124 transmits the second instruction information CM2 through the short-range wireless communication by means of NFC or the Wi-Fi communication to the printer 2. The first communication controller 124 transmits the first page information P11 of the first document information DC1 to the printer 2 through the Wi-Fi communication.

Although the first communication controller 124 transmits the second instruction information CM2 and the first page information P11 of the first document information DC1 to the printer 2, the present disclosure is not limited to this. The first communication controller 124 may transmit the first instruction information CM1 to the server apparatus that stores the first document information DC1 so as to transmit the first instruction information CM1 to the printer 2 through the server apparatus. The server apparatus may transmit the first instruction information CM1 to the printer 2 through a PC having a printer driver controlling the printer 2.

Although the smartphone 1 transmits the first page information P11 of the first document information DC1 stored in the first memory 13 to the printer 2, the present disclosure is not limited to this. The server apparatus stores the first document information DC1 in advance. When receiving the identification information of the printer 2 and the second instruction information CM2, the server apparatus may read the first page information P11 of the first document information DC1 associated with the second instruction information CM2 and transmit the second instruction information CM2 and first page information P11 of the first document information DC1 to the printer 2 corresponding to the identification information.

The second instruction information CM2 instructs printing of the first page information P11 of the first document information DC1.

The "first thumbnail image 311" corresponds to an example of a "first image".

Figure 6:
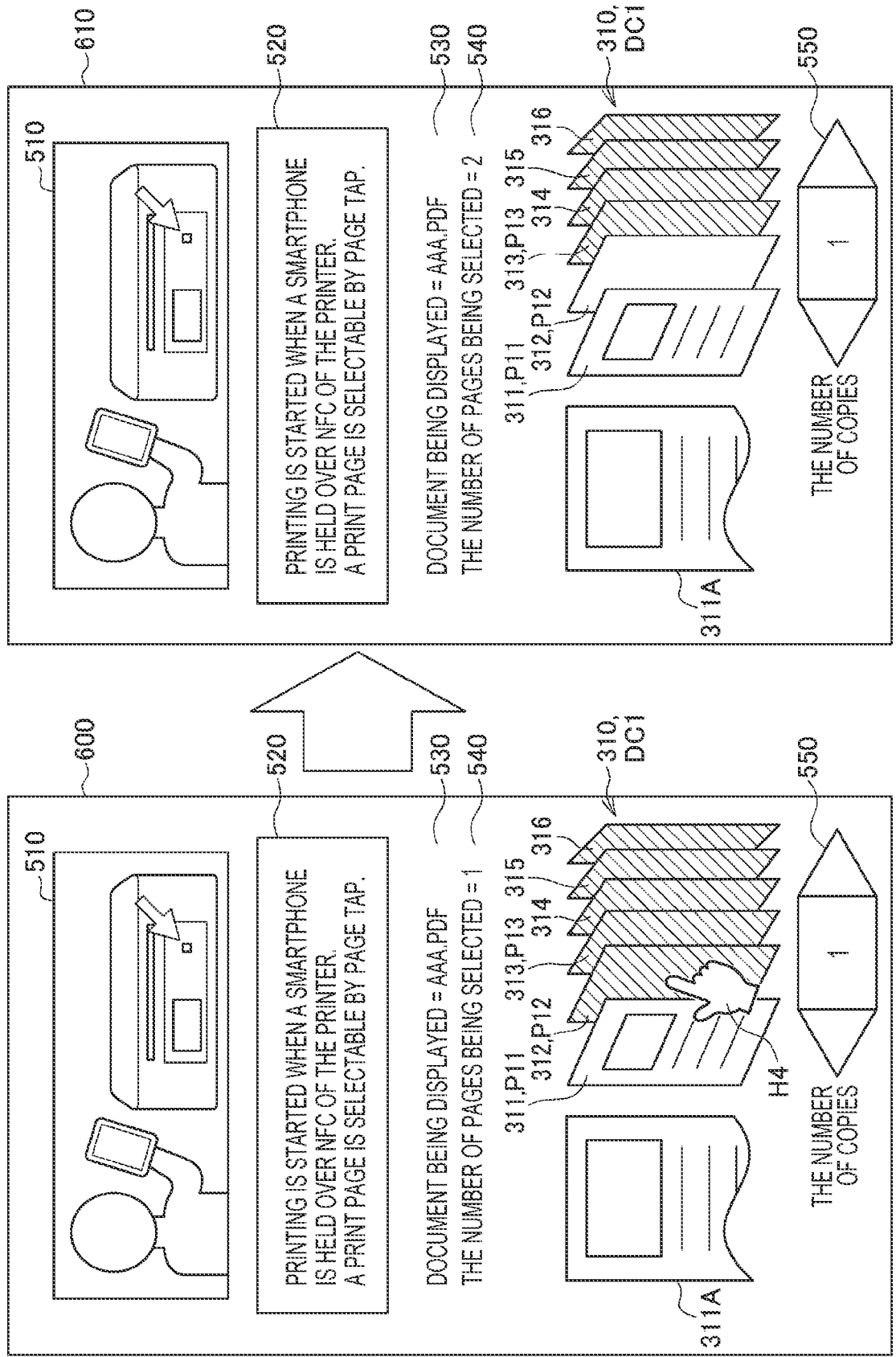
FIG. 6 is a diagram illustrating still another example of the preview screen.

FIG. 6 is a diagram illustrating an example in which the selection section 122 selects the first page information P11 and the first page information P12 as print targets from among the first page information P11 to the first page information P16 of the first document information DC1.

FIG. 6 is a diagram illustrating examples of the preview screen 600 and a preview screen 610.

The preview screen 600 of FIG. 5 is illustrated on a left side in FIG. 6.

When a finger H4 of the user touches the first thumbnail image 312 selected from among the first thumbnail image 311 to the first thumbnail image 316 included in the first thumbnail image bundle 310 displayed in the preview screen 600, the selection section 122 selects the first page information P12 associated with the first thumbnail image 312 as a print target. The selection section 122 selects the first page information P11 and the first page information P12 as print targets.

When the selection section 122 selects the first page information P12 as a print target in addition to the first page information P11, the display controller 121 performs control such that the first thumbnail image 312 is displayed in an emphasized manner in addition to the first thumbnail image 311. The display controller 121 performs control such that the first thumbnail image 311 and the first thumbnail image 312 are displayed in highlighting.

As illustrated in the preview screen 610 of FIG. 6, the display controller 121 performs control such that the first thumbnail image 313 to the first thumbnail image 316 are displayed darker than the first thumbnail image 311, the first thumbnail image 312, and the first main image 311A.

When the first main image 311A is obtained by displaying the first thumbnail image 311 in an enlarged manner, the first thumbnail image 311 and the first main image 311A are associated with the first page information P11. The first thumbnail image 312 is associated with the first page information P12.

When the selection section 122 selects the first page information P11 and the first page information P12 as print targets, the page count display section 540 displays text "the number of pages being selected =2".

Printing is instructed to the printer 2 when the user holds the smartphone 1 close to NFC of the printer 2 in a state in which the preview screen 610 is displayed as illustrated in FIG. 6.

The first communication controller 124 of the smartphone 1 transmits the third instruction information CM3 to the printer 2 through the first communication interface mechanism 15. The instruction reception section 211 of the printer 2 receives the third instruction information CM3 through the second communication interface mechanism 22. The print execution section 212 causes the print section 26 to perform printing corresponding to the third instruction information CM3. The print execution section 212 causes the print section 26 to perform printing of the first page information P11 and the first page information P12 of the first document information DC1.

The first communication controller 124 that has received the identification information of the printer 2 transmits the third instruction information CM3 to the printer 2 through the first communication interface mechanism 15 based on the identification information. The first communication controller 124 transmits the third instruction information CM3 through the short-range wireless communication by means of NFC or the Wi-Fi communication to the printer 2. The first communication controller 124 transmits the first page information P11 and the first page information P12 of the first document information DC1 to the printer 2 through the Wi-Fi communication.

Although the first communication controller 124 transmits the third instruction information CM3 and the first page information P11 and the first page information P12 of the first document information DC1 to the printer 2, the present disclosure is not limited to this. The first communication controller 124 may transmit the third instruction information CM3 to the server apparatus that stores the first document information DC1 so as to transmit the third instruction information CM3 to the printer 2 through the server apparatus. The server apparatus may transmit the third instruction information CM3 to the printer 2 through a PC having a printer driver controlling the printer 2.

Although the smartphone 1 transmits the first page information P11 and the first page information P12 of the first document information DC1 stored in the first memory 13 to the printer 2, the present disclosure is not limited to this. The server apparatus stores the first document information DC1 in advance. When receiving the identification information of the printer 2 and the third instruction information CM3, the server apparatus may read the first page information P11 and the first page information P12 of the first document information DC1 associated with the third instruction information CM3 and transmit the third instruction information CM3 and first page information P11 and the first page information P12 of the first document information DC1 to the printer 2 corresponding to the identification information.

The third instruction information CM3 instructs printing of the first page information P11 and the first page information P12 of the first document information DC1.

The first thumbnail image 312 corresponds to an example of a "second image".

Figure 7:
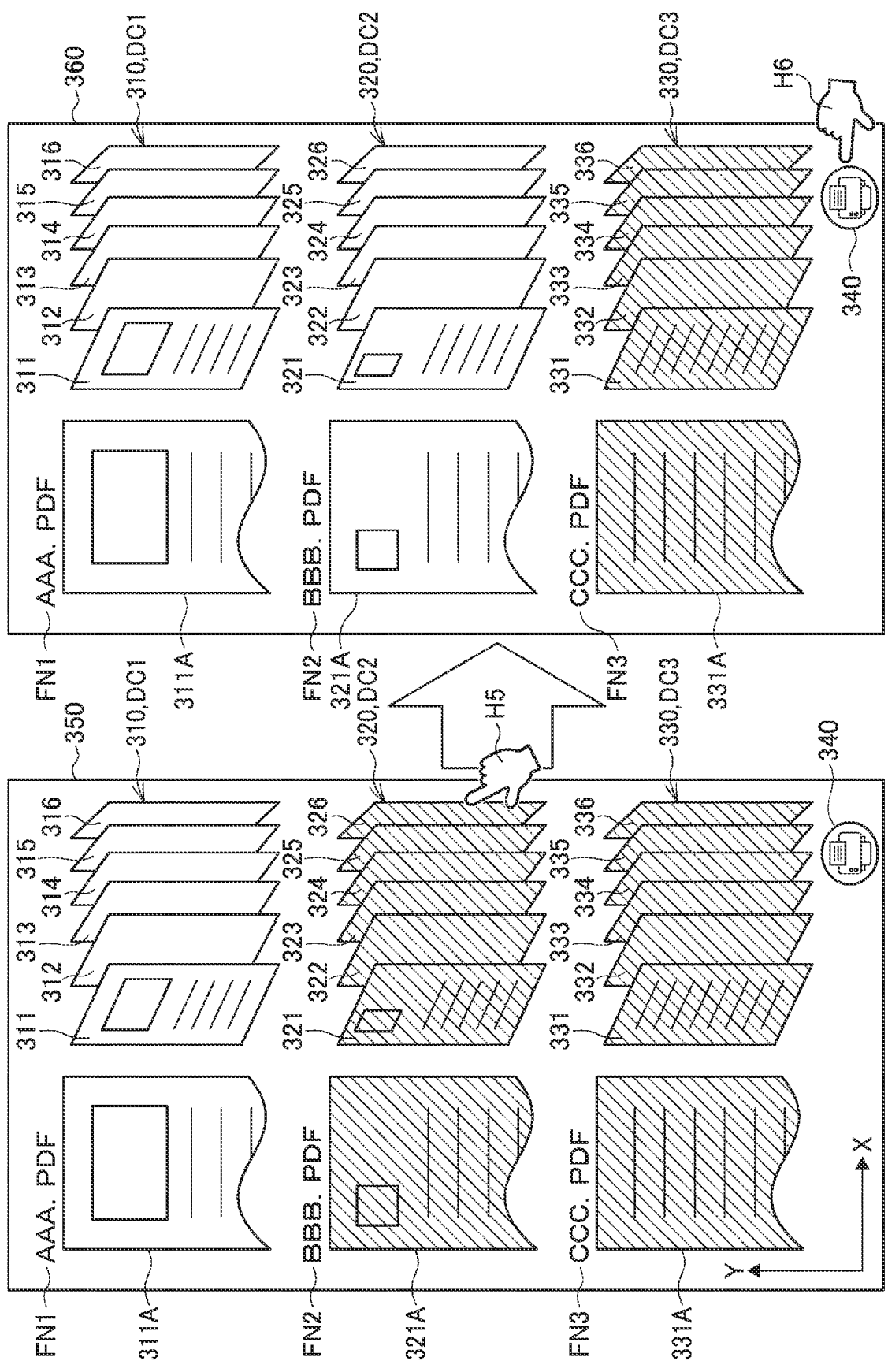
FIG. 7 is a diagram illustrating another example of the document selection screen.

FIG. 7 is a diagram illustrating an example in which the selection section 122 selects the first document information DC1 and the second document information DC2 as print targets.

FIG. 7 is a diagram illustrating examples of the document selection screen 350 and a document selection screen 360.

The document selection screen 350 of FIG. 3 is illustrated on a left side in FIG. 7.

When a finger H5 of the user touches the second thumbnail image bundle 320 selected from among the first thumbnail image bundle 310, the second thumbnail image bundle 320, and the third thumbnail image bundle 330 displayed in the document selection screen 350, the selection section 122 selects the second document information DC2 associated with the second thumbnail image bundle 320 in addition to the first document information DC1.

As illustrated in the document selection screen 360 of FIG. 7, the display controller 121 performs control such that the first thumbnail image bundle 310, the second thumbnail image bundle 320, the first main image 311A, and the second main image 321A are displayed in an emphasized manner. The display controller 121 performs control such that the first thumbnail image bundle 310, the second thumbnail image bundle 320, the first main image 311A, and the second main image 321A are displayed in highlighting.

As illustrated in the document selection screen 360 of FIG. 7, the display controller 121 performs control such that the third thumbnail image bundle 330 and the third main image 331A are displayed darker than the first thumbnail image bundle 320, the second thumbnail image bundle 310, the first main image 311A, and the second main image 321A.

When the user touches the print button 340 with a finger H6 in the document selection screen 360 of FIG. 7, the display controller 121 performs control such that the document selection screen 360 is switched to a preview screen 700 to be displayed in the display 141.

Figure 8:
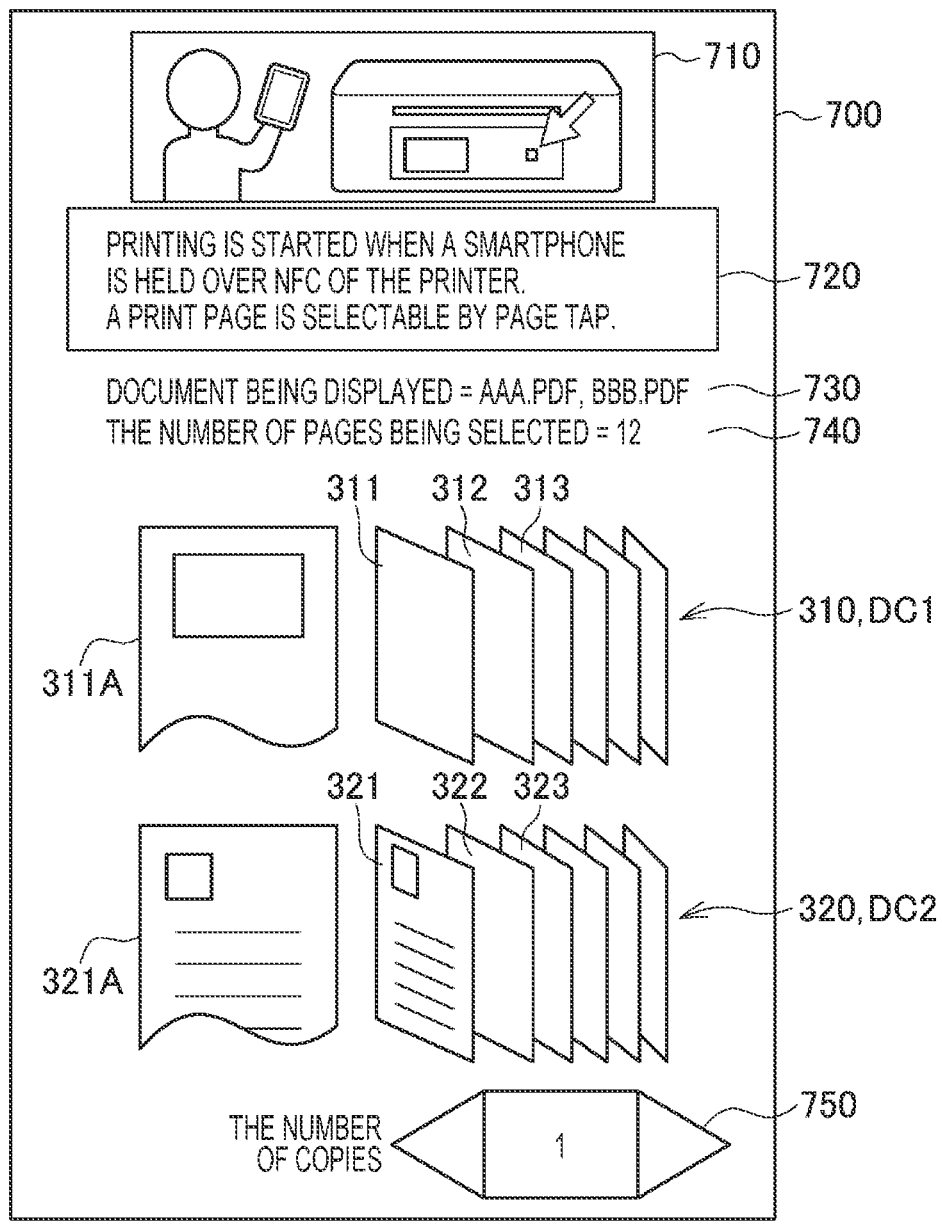
FIG. 8 is a diagram illustrating a further example of the preview screen.

FIG. 8 is a diagram illustrating an example of the preview screen 700.

The preview screen 700 is different from the preview screen 500 of FIG. 5 in that the second main image 321A and the second thumbnail image bundle 320 are displayed.

The preview screen 700 includes a guidance image display section 710, a guidance display section 720, a document name display section 730, a page count display section 740, the first main image 311A, the first thumbnail image bundle 310, the second main image 321A, the second thumbnail image bundle 320, and a copy count input section 750.

The copy count input section 750 corresponds to an example of the "reception section".

The preview screen 700 corresponds to an example of the "check screen".

The document name display section 730 in the preview screen 700 displays a document name of a document displayed in the preview screen 500. In FIG. 8, the document name display section 730 displays the document name "AAA.PDF" of the first thumbnail image bundle 310 and a document name "BBB.PDF" of the second thumbnail image bundle 320.

The page count display section 740 displays the number of pages of a document displayed in the preview screen 500. In FIG. 8, the page count display section 740 displays the number of pages included in the first thumbnail image bundle 310 and the second thumbnail image bundle 320.

In this embodiment, the number of pages included in the first thumbnail image bundle 310 is six and the number of pages included in the second thumbnail image bundle 320 is six, and therefore, the page count display section 740 displays text "the number of pages being selected=12".

Printing is instructed to the printer 2 when the user holds the smartphone 1 close to NFC of the printer 2 in a state in which the preview screen 700 is displayed as illustrated in FIG. 8.

The first communication controller 124 of the smartphone 1 transmits the fourth instruction information CM4 to the printer 2 through the first communication interface mechanism 15. The instruction reception section 211 of the printer 2 receives the fourth instruction information CM4 through the second communication interface mechanism 22. The print execution section 212 causes the print section 26 to perform printing corresponding to the fourth instruction information CM4. The print execution section 212 causes the print section 26 to perform printing of the first document information DC1 and the second document information DC2.

The first communication controller 124 that has received the identification information of the printer 2 transmits the fourth instruction information CM4 to the printer 2 through the first communication interface mechanism 15 based on the identification information. The first communication controller 124 transmits the fourth instruction information CM4 through the short-range wireless communication by means of NFC or the Wi-Fi communication to the printer 2. The first communication controller 124 transmits the first document information DC1 and the second document information DC2 to the printer 2 through the Wi-Fi communication.

Although the first communication controller 124 transmits the fourth instruction information CM4, the first document information DC1, and the second document information DC2 to the printer 2, the present disclosure is not limited to this. The first communication controller 124 may transmit the fourth instruction information CM4 to the server apparatus that stores the first document information DC1 so as to transmit the fourth instruction information CM4 to the printer 2 through the server apparatus. The server apparatus may transmit the fourth instruction information CM4 to the printer 2 through a PC having a printer driver controlling the printer 2.

Although the smartphone 1 transmits the first document information DC1 and the second document information DC2 stored in the first memory 13 to the printer 2, the present disclosure is not limited to this. The server apparatus stores the first document information DC1 and the second document information DC2 in advance. When receiving the identification information of the printer 2 and the fourth instruction information CM4, the server apparatus may read the first document information DC1 and the second document information DC2 associated with the fourth instruction information CM4 and transmit the fourth instruction information CM4, the first document information DC1, and the second document information DC2 to the printer 2 corresponding to the identification information.

The fourth instruction information CM4 instructs printing of the first document information DC1 and the second document information DC2.

The first thumbnail image bundle 310 corresponds to an example of a "first image bundle". The second thumbnail image bundle 320 corresponds to an example of a "second image bundle".

Figure 9:
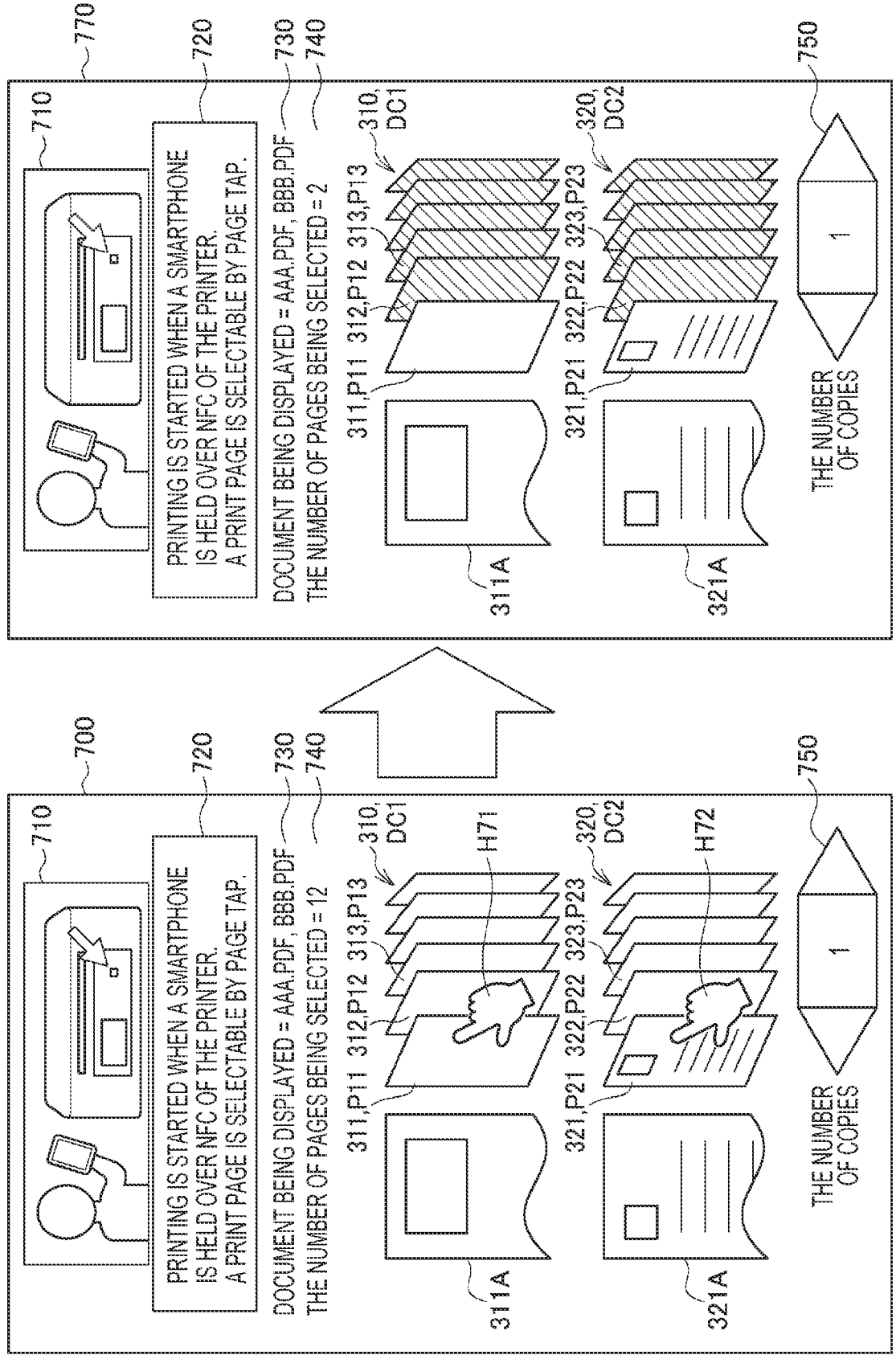
FIG. 9 is a diagram illustrating a still further example of the preview screen.

FIG. 9 is a diagram illustrating an example in which the selection section 122 selects the first page information P11 of the first document information DC1 and the second page information P21 of the second document information DC2 as print targets.

FIG. 9 is a diagram illustrating examples of the preview screen 700 and a preview screen 770.

The preview screen 700 of FIG. 8 is illustrated on a left side in FIG. 9.

When a finger H71 of the user touches the first thumbnail image 311 selected from among the first thumbnail image 311 to the first thumbnail image 316 included in the first thumbnail image bundle 310 displayed in the preview screen 700, the selection section 122 selects the first page information P11 associated with the first thumbnail image 311 as a print target.

When a finger H72 of the user touches the second thumbnail image 321 selected from among the second thumbnail image 321 to the second thumbnail image 326 included in the second thumbnail image bundle 320 displayed in the preview screen 700, the selection section 122 selects the second page information P21 associated with the second thumbnail image 321 as a print target.

The selection section 122 selects the first page information P11 and the second page information P21 as print targets.

When the selection section 122 selects the first page information P11 and the second page information P21 as print targets, the display controller 121 performs control such that the first thumbnail image 311 and the second thumbnail image 321 are displayed in an emphasized manner. When the first main image 311A is obtained by enlarging the first thumbnail image 311 and the second main image 321A is obtained by enlarging the second thumbnail image 321, the first main image 311A and the second main image 321A are displayed in an emphasized manner. The display controller 121 performs control such that the first thumbnail image 311, the first main image 311A, the second thumbnail image 321, and the second main image 321A are displayed in highlighting.

As illustrated in the preview screen 770 of FIG. 9, the display controller 121 performs control such that the first thumbnail image 312 to the first thumbnail image 316 and the second thumbnail image 322 to the second thumbnail image 326 are displayed darker than the first thumbnail image 311, the first main image 311A, the second thumbnail image 321, and the second main image 321A.

The page count display section 740 of the preview screen 770 displays the numbers of pages corresponding to the first page information P11 and the second page information P21 selected by the selection section 122.

In FIG. 9, the page count display section 740 displays text "the number of pages being selected=2".

Printing is instructed to the printer 2 when the user holds the smartphone 1 close to NFC of the printer 2 in a state in which the preview screen 770 is displayed as illustrated in FIG. 9.

The first communication controller 124 of the smartphone 1 transmits the fifth instruction information CM5 to the printer 2 through the first communication interface mechanism 15. The instruction reception section 211 of the printer 2 receives the fifth instruction information CM5 through the second communication interface mechanism 22. The print execution section 212 causes the print section 26 to perform printing corresponding to the fifth instruction information CM5. The print execution section 212 causes the print section 26 to perform printing of the first page information P11 and the second page information P21.

The first communication controller 124 that has received the identification information of the printer 2 transmits the fifth instruction information CM5 to the printer 2 through the first communication interface mechanism 15 based on the identification information. The first communication controller 124 transmits the fifth instruction information CM5 through the short-range wireless communication by means of NFC or the Wi-Fi communication to the printer 2. The first communication controller 124 transmits the first page information P11 of the first document information DC1 and the second page information P21 of the second document information DC2 to the printer 2 through the Wi-Fi communication.

Although the first communication controller 124 transmits the fifth instruction information CM5, the first page information P11 of the first document information DC1, and the second page information P21 of the second document information DC2 to the printer 2, the present disclosure is not limited to this. The first communication controller 124 may transmit the fifth instruction information CM5 to the server apparatus that stores the first document information DC1 and the second document information DC2 so as to transmit the fifth instruction information CM5 to the printer 2 through the server apparatus. The server apparatus may transmit the fifth instruction information CM5 to the printer 2 through a PC having a printer driver controlling the printer 2.

Although the smartphone 1 transmits the first page information P11 of the first document information DC1 and the second page information P21 of the second document information DC2 stored in the first memory 13 to the printer 2, the present disclosure is not limited to this. The server apparatus stores the first document information DC1 and the second document information DC2 in advance. When receiving the identification information of the printer 2 and the fifth instruction information CMS, the server apparatus may read the first page information P11 of the first document information DC1 and the second page information P21 of the second document information DC2 associated with the fifth instruction information CM5 and transmit the fifth instruction information CM5, the first page information P11 of the first document information DC1, and the second page information P21 of the second document information DC2 to the printer 2 corresponding to the identification information.

The fifth instruction information CM5 instructs printing of the first page information P11 of the first document information DC1 and the second page information P21 of the second document information DC2.

The first thumbnail image 311 corresponds to an example of a "first image". Furthermore, the second thumbnail image 321 corresponds to an example of a "third image".

Figure 10:
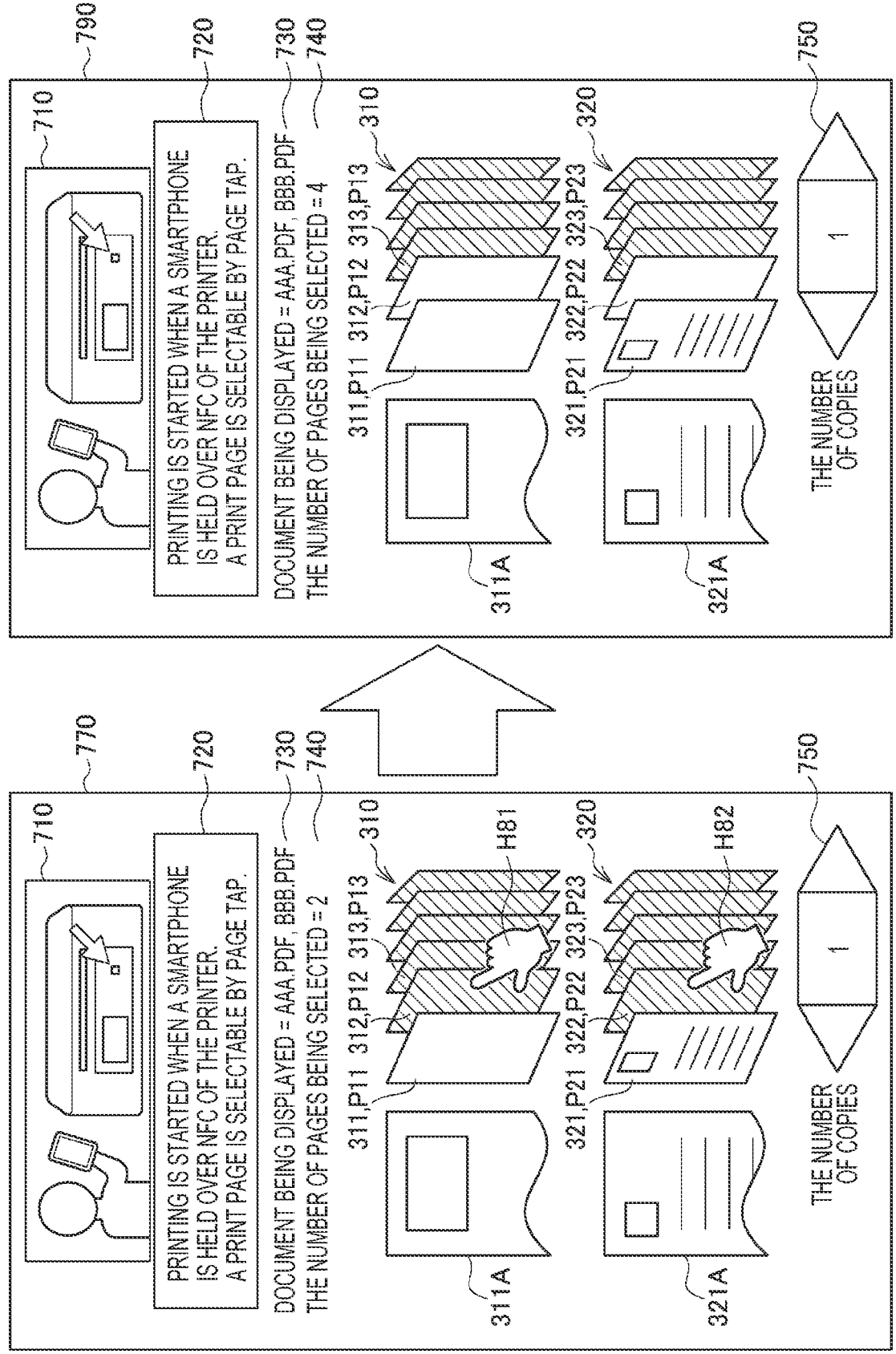
FIG. 10 is a diagram illustrating a still further example of the preview screen.

FIG. 10 is a diagram illustrating an example in which the selection section 122 selects the first page information P11 and the first page information P12 of the first document information DC1 and the second page information P21 and the second page information P22 of the second document information DC2 as print targets.

FIG. 10 is a diagram illustrating examples of the preview screen 770 and a preview screen 790.

The preview screen 770 of FIG. 9 is illustrated on a left side in FIG. 10.

When a finger H81 of the user touches the first thumbnail image 312 selected from among the first thumbnail image 311 to the first thumbnail image 316 included in the first thumbnail image bundle 310 displayed in the preview screen 770, the selection section 122 selects the first page information P12 associated with the first thumbnail image 312 as a print target in addition to the first page information P11.

When a finger H82 of the user touches the second thumbnail image 322 selected from among the second thumbnail image 321 to the second thumbnail image 326 included in the second thumbnail image bundle 320 displayed in the preview screen 770, the selection section 122 selects the second page information P22 associated with the second thumbnail image 322 as a print target in addition to the second page information P21.

The selection section 122 selects the first page information P11, the first page information P12, the second page information P21, and the second page information P22 as print targets.

When the selection section 122 selects the first page information P11, the first page information P12, the second page information P21, and the second page information P22 as print targets, the display controller 121 performs control such that the first thumbnail image 312 and the second thumbnail image 322 are displayed in an emphasized manner in addition to the first thumbnail image 311, the first main image 311A, the second thumbnail image 321, and the second main image 321A. The display controller 121 performs control such that the first thumbnail image 311, the first thumbnail image 312, the first main image 311A, the second thumbnail image 321, the second thumbnail image 322, and the second main image 321A are displayed in highlighting.

As illustrated in the preview screen 790 of FIG. 10, the display controller 121 performs control such that the first thumbnail image 313 to the first thumbnail image 316 and the second thumbnail image 323 to the second thumbnail image 326 are displayed darker than the first thumbnail images 311 and 312, the first main image 311A, the second thumbnail images 321 and 322, and the second main image 321A.

The page count display section 740 of the preview screen 790 displays the numbers of pages corresponding to the first page information P11, the first page information P12, the second page information P21, and the second page information P22 selected by the selection section 122.

In FIG. 10, the page count display section 740 displays text "the number of pages being selected=4".

Printing is instructed to the printer 2 when the user holds the smartphone 1 close to NFC of the printer 2 in a state in which the preview screen 790 is displayed as illustrated in FIG. 10.

The first communication controller 124 of the smartphone 1 transmits the sixth instruction information CM6 to the printer 2 through the first communication interface mechanism 15. The instruction reception section 211 of the printer 2 receives the sixth instruction information CM6 through the second communication interface mechanism 22. The print execution section 212 causes the print section 26 to perform printing corresponding to the sixth instruction information CM6. The print execution section 212 causes the print section 26 to execute printing of the first page information P11, the first page information P12, the second page information P21, and the second page information P22.

The first communication controller 124 that has received the identification information of the printer 2 transmits the sixth instruction information CM6 to the printer 2 through the first communication interface mechanism 15 based on the identification information. The first communication controller 124 transmits the sixth instruction information CM6 through the short-range wireless communication by means of NFC or the Wi-Fi communication to the printer 2. The first communication controller 124 transmits the first page information P11 and the first page information P12 of the first document information DC1 and the second page information P21 and the second page information P22 of the second document information DC2 to the printer 2 through the Wi-Fi communication.

Although the first communication controller 124 transmits the sixth instruction information CM6, the first page information P11 and the first page information P12 of the first document information DC1, and the second page information P21 and the second page information P22 of the second document information DC2 to the printer 2, the present disclosure is not limited to this. The first communication controller 124 may transmit the sixth instruction information CM6 to the server apparatus that stores the first document information DC1 and the second document information DC2 so as to transmit the sixth instruction information CM6 to the printer 2 through the server apparatus. The server apparatus may transmit the sixth instruction information CM6 to the printer 2 through a PC having a printer driver controlling the printer 2.

Although the smartphone 1 transmits the first page information P11 and the first page information P12 of the first document information DC1 and the second page information P21 and the second page information P22 of the second document information DC2 stored in the first memory 13 to the printer 2, the present disclosure is not limited to this. The server apparatus stores the first document information DC1 and the second document information DC2 in advance. When receiving the identification information of the printer 2 and the sixth instruction information CM6, the server apparatus may read the first page information P11 and the first page information P12 of the first document information DC1 and the second page information P21 and the second page information P22 of the second document information DC2 associated with the sixth instruction information CM6 and transmit the sixth instruction information CM6, the first page information P11 and the first page information P12 of the first document information DC1, and the second page information P21 and the second page information P22 of the second document information DC2 to the printer 2 corresponding to the identification information.

The sixth instruction information CM6 instructs printing of the first page information P11 and the first page information P12 of the first document information DC1 and the second page information P21 and second page information P22 of the second document information DC2.

The first thumbnail image 311 corresponds to an example of a "first image", and the first thumbnail image 312 corresponds to an example of a "second image". Furthermore, the second thumbnail image 321 corresponds to an example of a "third image", and the second thumbnail image 322 corresponds to an example of a "fourth image".

Figure 11:
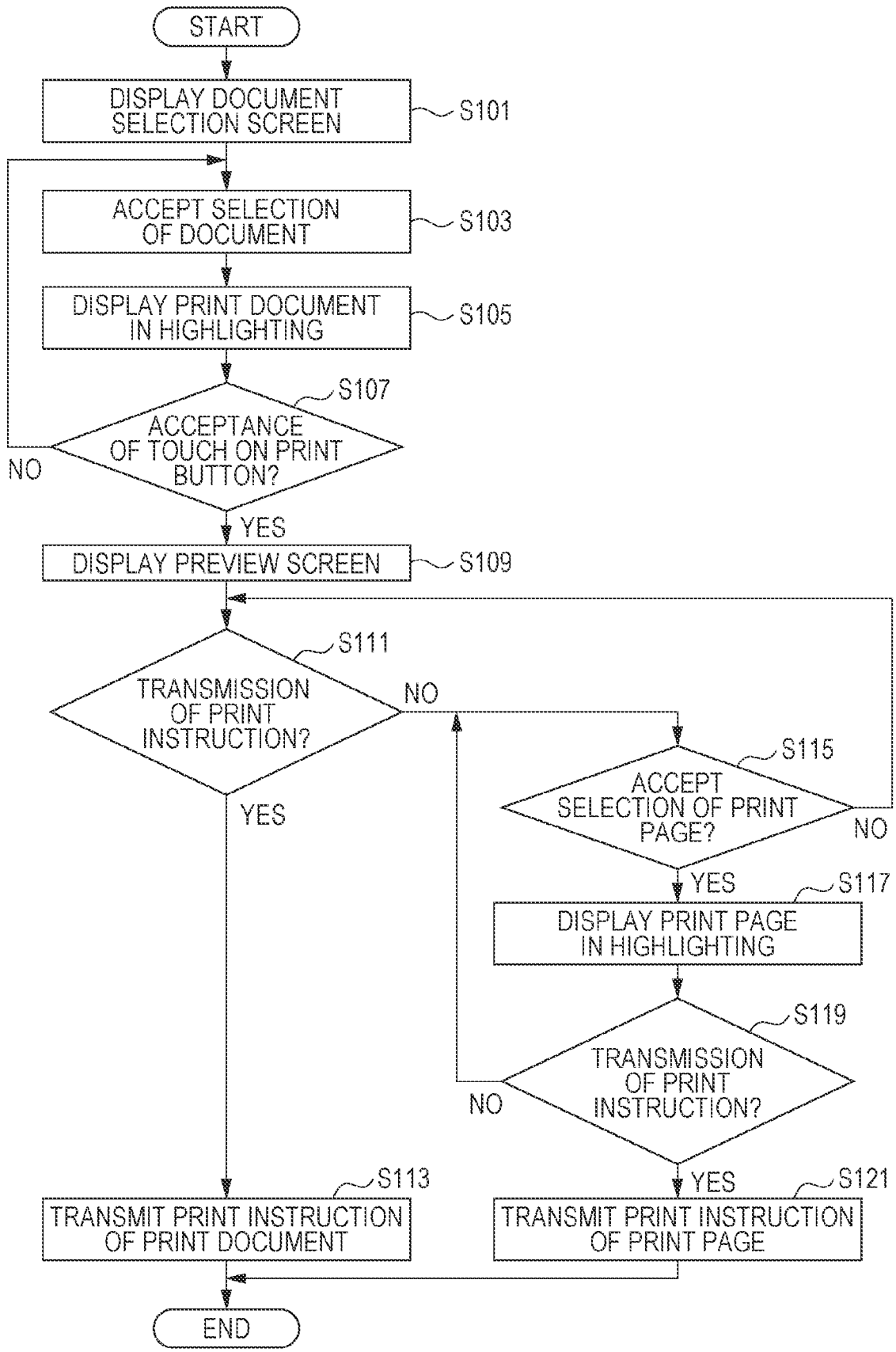
FIG. 11 is a flowchart of an example of a process of a first controller of the smartphone.

FIG. 11 is a flowchart of an example of a process of the first controller 11 of the smartphone 1.

In a description with reference to FIG. 11, the document selection screens 300, 350, and 360 are collectively referred to as a document selection screen 300. The preview screens 500, 600, 610, 700, 770, and 790 are collectively referred to as a preview screen 500.

As illustrated in FIG. 11, in step S101, the display controller 121 performs control such that the document selection screen 300 is displayed in the display 141.

After the display 141 displays the document selection screen 300, the selection section 122 receives an operation performed by the user and selects the document information DC to be printed by the printer 2 through the document selection screen 300 in step S103.

When the document information DC is selected, the display controller 121 performs control such that a thumbnail image bundle associated with the document information DC selected by the selection section 122 is displayed in highlighting in step S105.

After the display controller 121 displays the thumbnail image bundle in highlighting, the first controller 11 determines whether a touch operation performed by the user on the print button 340 has been received in step S107.

When the first controller 11 determines that a touch operation is not performed by the user on the print button 340 (step S107; NO), the process returns to step S103. When the first controller 11 determines that a touch operation has been performed by the user on the print button 340 (step S107; YES), the process proceeds to step S109.

In step S109, the display controller 121 performs control such that the preview screen 500 is displayed.

After the display controller 121 displays the preview screen 500, the first communication controller 124 determines whether the print instruction information CM is to be transmitted to the printer 2 through the first communication interface mechanism 15 in step S111. When a distance between the smartphone 1 and the printer 2 becomes smaller than a predetermined distance, the first communication controller 124 determines that the print instruction information CM is to be transmitted to the printer 2. The predetermined distance is 10 mm, for example.

When the first communication controller 124 determines that the print instruction information CM is to be transmitted to the printer 2 (step S111; YES), the process proceeds to step S113.

In step S113, the first communication controller 124 transmits the print instruction information CM corresponding to the document information DC selected by the selection section 122 to the printer 2. Thereafter, the process is terminated.

When the first communication controller 124 determines that the print instruction information CM is not to be transmitted to the printer 2 (step S111; NO), the process proceeds to step S115.

In step S115, the selection section 122 determines whether the page information PG to be printed by the printer 2 has been selected based on an operation performed by the user through the preview screen 500.

When the selection section 122 determines that the print page has not been selected (step S115; NO), the process returns to step S111. When the selection section 122 determines that the print page has been selected (step S115; YES), the process proceeds to step S117.

In step S117, the display controller 121 performs control such that a thumbnail image associated with the page information PG selected by the selection section 122 is displayed in highlighting.

After the thumbnail image is displayed in highlighting, the first communication controller 124 determines whether the print instruction information CM is to be transmitted to the printer 2 through the first communication interface mechanism 15 in step S119.

When the first communication controller 124 determines that the print instruction information CM is not to be transmitted (step S119; NO), the process returns to step S115. When the first communication controller 124 determines that the print instruction information CM is to be transmitted (step S119; YES), the process proceeds to step S121.

In step S121, the first communication controller 124 transmits the print instruction information CM corresponding to the page information PG selected by the selection section 122 to the printer 2 through the first communication interface mechanism 15. After the first communication controller 124 transmits the print instruction information CM, the process is terminated.

As described with reference to FIG. 11, the first input display mechanism 14 receives a selection of a thumbnail image bundle associated with the document information DC to be printed by the printer 2 based on an operation performed by the user through the document selection screen 300. The selection section 122 selects the document information DC associated with the thumbnail image bundle based on an operation performed by the user received by the first input display mechanism 14. The first communication controller 124 transmits the print instruction information CM corresponding to a document to be printed corresponding to the document information DC selected by the selection section 122 to the printer 2. Accordingly, the smartphone 1 may transmit the print instruction information CM for instructing printing of the document information DC selected by the selection section 122 to the printer 2.

The selection section 122 selects a print page corresponding to the page information PG to be printed by the printer 2. The first communication controller 124 transmits the print instruction information CM corresponding to a page to be printed corresponding to the page information PG selected by the selection section 122 to the printer 2. Accordingly, the smartphone 1 may transmit the print instruction information CM for instructing printing of the page information PG selected by the selection section 122 to the printer 2.

As described above, as illustrated with reference to FIGS. 1 to 11, the smartphone 1 according to this embodiment includes the display 141 that displays the first thumbnail image 311, the first thumbnail image 312, and the first thumbnail image bundle 310 including the first thumbnail image 311 and the first thumbnail image 312, the display controller 121 that receives a signal based on a user operation, the selection section 122 that selects at least one of the first document information DC1 associated with the first thumbnail image bundle 310, the first page information P11 associated with the first thumbnail image 311, and the first page information P12 associated with the first thumbnail image 312 based on the signal received by the display controller 121, and the first communication controller 124 that transmits the print instruction information CM indicating an instruction for printing based on a result of the selection performed by the selection section 122. The first communication controller 124 transmits, when the selection section 122 selects the first document information DC1 but does not select the first page information P11 or the first page information P12, the first instruction information CM1 instructing printing of the first document information DC1 as the print instruction information CM, and transmits, when the selection section 122 selects the first page information P12, the second instruction information CM2 instructing printing of the first page information P12 as the print instruction information CM.

With this configuration, the smartphone 1 is not required to display a page selection screen which does not display image bundles. The smartphone 1 may display the page selection screen including a block of images, cause the user to select one of the images, and transmit a print instruction based on a result of the selection. When the user does not select any of the images, the smartphone 1 may transmit an instruction for printing the image bundle. The user may select one of the images in a state in which the image bundle is displayed, that is, the user may select individual images while recognizing an entire document.

When the selection section 122 selects the first page information P11 and the first page information P12, the first communication controller 124 transmits the third instruction information CM3 instructing printing of the first page information P11 and the first page information P12.

With this configuration, the smartphone 1 instructs the printer 2 to print the first page information P11 and the first page information P12 by transmitting the third instruction information CM3 to the printer 2. Accordingly, the smartphone 1 may easily instruct the printer 2 to perform printing.

The display controller 121 may display the second thumbnail image bundle 320 including the second thumbnail image 321 and the second thumbnail image 322, the selection section 122 may select at least one of the second page information P21 associated with the second thumbnail image 321 and the second page information P22 associated with the second thumbnail image 322.

With this configuration, the user may select the second page information P21, the second page information P22, or the second document information DC2 as a print target.

When the selection section 122 selects the second document information DC2 but does not select the second page information P21 or the second page information P22, the first communication controller 124 transmits the fourth instruction information CM4 instructing printing of the second document information DC2 as the print instruction information CM.

With this configuration, the smartphone 1 may instruct printing of the second document information DC2 by transmitting the fourth instruction information CM4. Accordingly, the smartphone 1 may easily instruct the printer 2 to perform printing.

When the first communication controller 124 receives the second document information DC2, the display 141 displays the second thumbnail image bundle 320.

With this configuration, since the second thumbnail image bundle 320 is displayed, the user may view the second thumbnail image bundle 320. Accordingly, the user may recognize that the second thumbnail image bundle 320 has been received. Consequently, usability may be improved.

When the selection section 122 selects the first page information P11, the display 141 displays the first thumbnail image 311 in an emphasized manner, and when the selection section 122 selects the first document information DC1, the display 141 displays the first thumbnail image bundle 310 in an emphasized manner.

With this configuration, when the first thumbnail image 311 is displayed in an emphasized manner, the user may recognize that the first page information P11 associated with the first thumbnail image 311 is selected. Furthermore, when the first thumbnail image 310 is displayed in an emphasized manner, the user may recognize that the first document information DC1 associated with the first thumbnail image bundle 310 is selected. Accordingly, usability may be improved.

Before the first communication controller 124 transmits the print instruction information CM, the display 141 displays the preview screen 500 including the first thumbnail image bundle 310.

With this configuration, before the print instruction information CM is transmitted to the printer 2, the user may recognize the first thumbnail image bundle 310 that is a print target or that includes a print target. Accordingly, usability may be improved.

The preview screen 500 displays the copy count input section 550 that receives an instruction for the number of copies PS.

With this configuration, before the smartphone 1 transmits the print instruction information CM to the printer 2, the user may set the number of copies PS. Accordingly, usability may be improved.

The first control program PGM1 according to this embodiment causes the first controller 11 to execute a print instruction transmitted to the printer 2. The first control program PGM1 causes a computer to function as the display controller 121 that displays the first thumbnail image 311, the first thumbnail image 312, and the first thumbnail image bundle 310 including the first thumbnail image 311 and the first thumbnail image 312 in the display 141 and receives a signal based on a user operation, the selection section 122 that selects at least one of the first document information DC1 associated with the first thumbnail image bundle 310, the first page information P11 associated with the first thumbnail image 311, and the first page information P12 associated with the first thumbnail image 312 based on the signal received by the display controller 121, and the first communication controller 124 that transmits the print instruction information CM indicating an instruction for printing based on a result of the selection performed by the selection section 122. The first communication controller 124 transmits, when the selection section 122 selects the first document information DC1 but does not select the first page information P11 or the first page information P12, the first instruction information CM1 instructing printing of the first document information DC1 as the print instruction information CM, and transmits, when the selection section 122 selects the first page information P11, the second instruction information CM2 instructing printing of the first page information P11 as the print instruction information CM.

With this configuration, effects the same as the smartphone 1 according to this embodiment may be attained.

The print system 100 according to this embodiment includes the printer 2 and the smartphone 1. The smartphone 1 includes the display 141 section that displays the first thumbnail image 311, the first image 312, and the first thumbnail image bundle 310 including the first thumbnail image 311 and the first thumbnail image 312, the display controller 121 that receives a signal based on a user operation, the selection section 122 that selects at least one of the first document information DC1 associated with the first thumbnail image bundle 310, the first page information P11 associated with the first thumbnail image 311, and the first page information P12 associated with the first thumbnail image 312 based on the signal received by the display controller 121, and the first communication controller 124 that transmits the print instruction information CM indicating an instruction for printing based on a result of the selection performed by the selection section 122. The first communication controller 124 transmits, when the selection section 122 selects the first document information DC1 but does not select the first page information P11 or the first page information P12, the first instruction information CM1 instructing printing of the first document information DC1 as the print instruction information CM, and transmits, when the selection section 122 selects the first page information P11, the second instruction information CM2 instructing printing of the first page information P11 as the print instruction information CM. The printer 2 executes printing based on the print instruction information CM.

With this configuration, effects the same as the smartphone 1 according to this embodiment may be attained.

This embodiment is merely a certain mode and various modifications and applications may be arbitrarily made within the scope of the present disclosure.

Although the "print instruction apparatus" is the smartphone 1 in this embodiment, the "print instruction apparatus" is not limited to this. The "print instruction apparatus" at least includes the first processor 12, the first memory 13, and the first communication interface mechanism 15. The "print instruction apparatus" may be constituted by a laptop personal computer or a tablet terminal.

Although the ink jet printer 2 using ink as print material is illustrated in this embodiment, an electrophotographic printer using toner as print material may be employed.

Although the print instruction method realized when the first processor 12 included in the smartphone 1 executes the first control program PGM1 is illustrated in this embodiment, a mode of a recording medium recording, in a computer readable manner, the first control program PGM1 to be executed by the first processor 12 to realize the print instruction method or a mode of a transmission medium for transmitting the first control program PGM1 may be employed. Examples of the recording medium include a magnetic recording medium, an optical recording medium, and a semiconductor memory device. Examples of the recording medium include a portable recording medium and a fixed recording medium, such as a flexible disk, an HDD (Hard Disk Drive), a CD-ROM (Compact Disk Read Only Memory), a DVD (Digital Versatile Disk), Blu-ray (registered trademark), Disc, a magneto-optical disc, a flash memory, and a card-type recording medium. The recording medium may be a nonvolatile storage device, such as a RAM, a ROM, or an HDD, that is an internal storage device included in the printer 2.

The function of the first controller 11 may be realized by one or more processors or a semiconductor chip. The first controller 11 may further include a co-processor, such as SoC (System-on-a-Chip), MCU (Micro Control Unit), or FPGA (Field-Programmable Gate Array). The first controller 11 may perform various control operations using both the CPU and the co-processor in cooperation or selectively using one of the CPU and the co-processor.

As a processing unit of the flowchart in FIG. 11, the process of the first controller 11 is divided according to main processing contents for facilitating understanding of the process of the first controller 11, and the processing unit is not limited by a method of the division and a name of the processing unit. The processing unit in the flowchart may be further divided into a larger number of processing units according to processing content. The division may be made so that a single processing unit include a larger number of processes. The order of processes may be appropriately changed within the scope of the present disclosure.

The function sections illustrated in FIGS. 1 and 2 illustrate functional structures, and concrete implementation modes are not particularly limited. Hardware is not required to be implemented for each of the function sections, and a single processor may execute programs so as to realize functions of the plurality of function sections. A number of the functions realized by software in the embodiment described above may be realized by hardware, or a number of the functions realized by hardware may be realized by software. In addition, detailed configurations of the other sections included in the smartphone 1 and the printer 2 may be arbitrarily changed without departing from the scope of the present disclosure.

What is claimed is:

1. A print instruction apparatus that communicates with a print apparatus, comprising:
    a display section that displays a first image, a second image, and a first image bundle including the first image and the second image;
    a display controller that receives a signal based on a user operation;
    a selection section that selects at least one of first document information associated with the first image bundle, first image information associated with the first image, and second image information associated with the second image based on the signal received by the display controller; and
    a communication section that transmits print instruction information indicating an instruction for printing based on a result of the selection performed by the selection section, wherein
    the communication section
        transmits, when the selection section selects the first document information but does not select the first image information or the second image information, first instruction information instructing printing of the first document information as the print instruction information, and
        transmits, when the selection section selects the first image information, second instruction information instructing printing of the first image information as the print instruction information.

2. The print instruction apparatus according to claim 1, wherein the communication section transmits, when the selection section selects the first image information and the second image information, third instruction information instructing printing of the first image information and the second image information as the print instruction information.

3. The print instruction apparatus according to claim 1, wherein
the display section displays a second image bundle including a third image and a fourth image, and
the selection section is configured to select at least one of second document information associated with the second image bundle, third image information associated with the third image, and fourth image information associated with the fourth image.

4. The print instruction apparatus according to claim 3, wherein the communication section transmits, when the selection section selects the second document information but does not select the first image information, the second image information, the third image information, or the fourth image information, fourth instruction information instructing printing of the second document information as the print instruction information.

5. The print instruction apparatus according to claim 3, wherein the display section displays the second image bundle associated with the second document information when the communication section receives the second document information.

6. The print instruction apparatus according to claim 1, wherein
the display section displays the first image in an emphasized manner when the selection section selects the first image information, and
the display section displays the first image bundle in an emphasized manner when the selection section selects the first document information.

7. The print instruction apparatus according to claim 1, wherein the display section displays a check screen including the first image bundle before the communication section transmits the print instruction information.

8. The print instruction apparatus according to claim 7, wherein the check screen displays a reception section that receives an instruction for the number of copies.

9. A non-transitory computer-readable storage medium storing a control program that causes a computer to execute a print instruction transmitted to a print apparatus, the control program causes a computer to function as:
a display controller that displays a first image, a second image, and a first image bundle including the first image and the second image in a display section and receives a signal based on a user operation;
a selection section that selects at least one of first document information associated with the first image bundle, first image information associated with the first image, and second image information associated with the second image based on the signal received by the display controller; and
a communication section that transmits print instruction information indicating an instruction for printing based on a result of the selection performed by the selection section, wherein
the communication section
transmits, when the selection section selects the first document information but does not select the first image information or the second image information, first instruction information instructing printing of the first document information as the print instruction information, and
transmits, when the selection section selects the first image information, second instruction information instructing printing of the first image information as the print instruction information.

10. A print system including a print apparatus and a print instruction apparatus, wherein
the print instruction apparatus includes
a display section that displays a first image, a second image, and a first image bundle including the first image and the second image,
a display controller that receives a signal based on a user operation,
a selection section that selects at least one of first document information associated with the first image bundle, first image information associated with the first image, and second image information associated with the second image based on the signal received by the display controller, and
a communication section that transmits print instruction information indicating an instruction for printing to the print apparatus based on a result of the selection performed by the selection section,
the communication section
transmits, when the selection section selects the first document information but does not select the first image information or the second image information, first instruction information instructing printing of the first document information as the print instruction information, and
transmits, when the selection section selects the first image information, second instruction information instructing printing of the first image information as the print instruction information, and
the print apparatus executes printing based on the print instruction information.

* * * * *